(12) United States Patent
Höchsmann et al.

(10) Patent No.: US 8,951,033 B2
(45) Date of Patent: Feb. 10, 2015

(54) CONSTRUCTION BOX FOR A RAPID PROTOTYPING SYSTEM

(75) Inventors: Rainer Höchsmann, Langenneufnach (DE); Alexander Müller, Königsbrunn (DE); Herbert Ludl, Meitingen (DE); Bernd Krabler, Thierhaupten (DE); Thomas Leinauer, Diedorf (DE)

(73) Assignee: ExOne GmbH, Augsburg (DE)

( * ) Notice: Subject to any disclaimer, the term of this patent is extended or adjusted under 35 U.S.C. 154(b) by 329 days.

(21) Appl. No.: 13/255,124

(22) PCT Filed: Dec. 2, 2010

(86) PCT No.: PCT/EP2010/068770
§ 371 (c)(1),
(2), (4) Date: Sep. 4, 2012

(87) PCT Pub. No.: WO2011/067352
PCT Pub. Date: Jun. 9, 2011

(65) Prior Publication Data
US 2013/0004607 A1  Jan. 3, 2013

(30) Foreign Application Priority Data
Dec. 2, 2009  (DE) .......................... 10 2009 056 696

(51) Int. Cl.
*B29C 67/00* (2006.01)
*B29C 37/00* (2006.01)
*B22F 3/105* (2006.01)

(52) U.S. Cl.
CPC ........... *B29C 67/0085* (2013.01); *B22F 3/1055* (2013.01); *B29C 67/0077* (2013.01); *B29C 67/0081* (2013.01); *B22F 2003/1056* (2013.01)

USPC ........ 425/186; 206/761; 312/319.8; 425/375; 425/472

(58) Field of Classification Search
CPC .................... B29C 67/0085; B22F 2003/1056
USPC ...................... 425/182, 186, 174.4, 375, 472; 206/761; 312/319.8
See application file for complete search history.

(56) References Cited

U.S. PATENT DOCUMENTS

| 6,027,682 A * | 2/2000 | Almquist et al. .............. 425/375 |
| 6,066,285 A | 5/2000 | Kumar |
| 6,821,473 B2 * | 11/2004 | Hiizumi et al. ............... 425/375 |

(Continued)

FOREIGN PATENT DOCUMENTS

| DE | 25 16 826 A1 | 10/1976 |
| DE | 100 47 614 A1 | 4/2002 |

(Continued)

*Primary Examiner* — Robert B Davis
(74) *Attorney, Agent, or Firm* — Arent Fox LLP

(57) ABSTRACT

The invention relates to a construction box (200) comprising a front wall (220), a rear wall and two side walls (224, 226), which delimit a construction box interior that houses a height-adjustable construction platform (210). The construction box (200) has dedicated travelling gear (250) integrated in to the construction box for propelling said box (2000 between a construction position, in which the construction box (2000 is positioned within the frame (150) of the system (100) to allow the shaped body to be built up and an additional construction box position, such as a construction box unpacking position, in which the construction box (200) is propelled out of the frame (150) of the system (100) to permit the unpacking of the built-up shaped body.

19 Claims, 31 Drawing Sheets

(56) References Cited

U.S. PATENT DOCUMENTS

Figure 1:
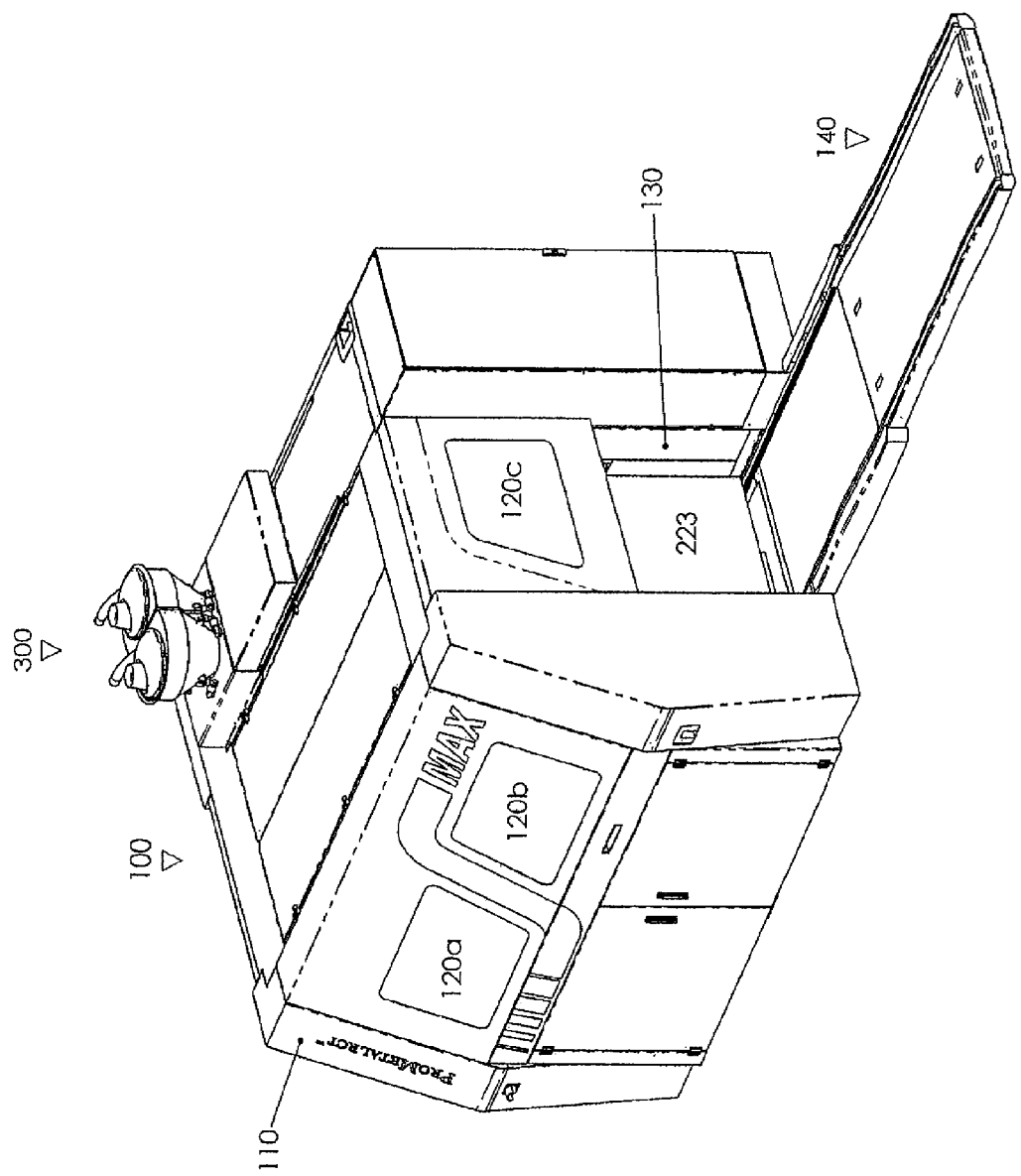

| | | | |
|---|---|---|---|
| 6,824,714 B1 * | 11/2004 | Turck et al. | 425/174.4 |
| 2004/0035542 A1 * | 2/2004 | Ederer et al. | 164/45 |
| 2006/0022379 A1 * | 2/2006 | Wicker et al. | 425/174.4 |
| 2008/0053998 A1 * | 3/2008 | Hochsmann et al. | 220/287 |
| 2010/0228381 A1 | 9/2010 | Matsui et al. | |

FOREIGN PATENT DOCUMENTS

| | | |
|---|---|---|
| DE | 100 47 615 A1 | 4/2002 |
| DE | 100 49 043 A1 | 5/2002 |
| DE | 10 2004 057 866 A1 | 6/2006 |
| DE | 10 2006 014 281 A1 | 10/2006 |
| DE | 20 2006 010 327 U1 | 12/2007 |
| EP | 2 292 412 A1 | 3/2011 |
| EP | 2 391 499 B1 | 11/2013 |
| WO | WO 01/14126 A1 | 3/2001 |
| WO | WO 03/020616 A2 | 3/2003 |
| WO | WO 03/020616 A2 | 3/2003 |
| WO | WO 2011/067352 A2 | 6/2011 |

* cited by examiner

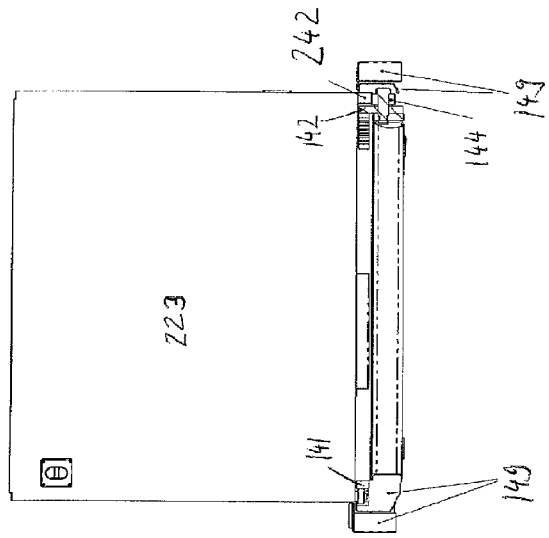
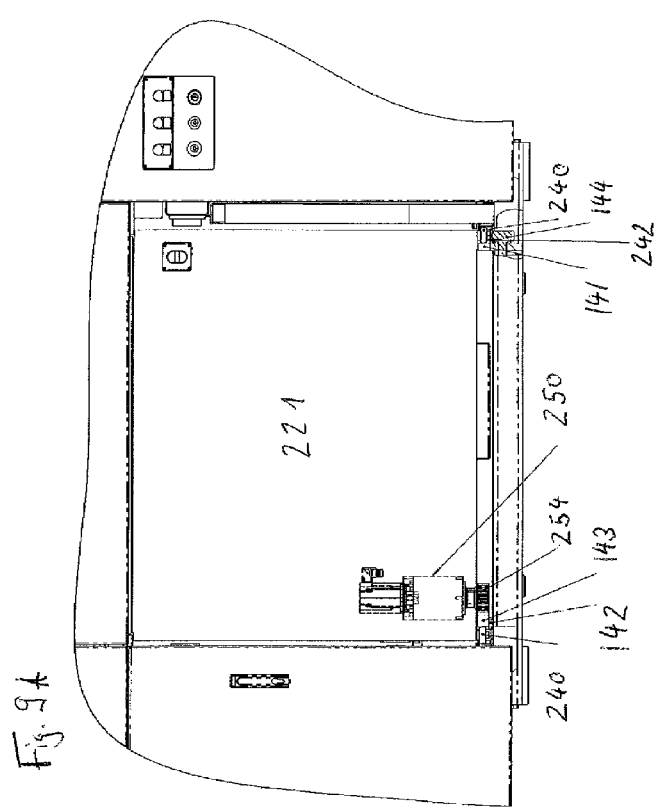

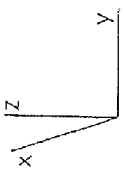
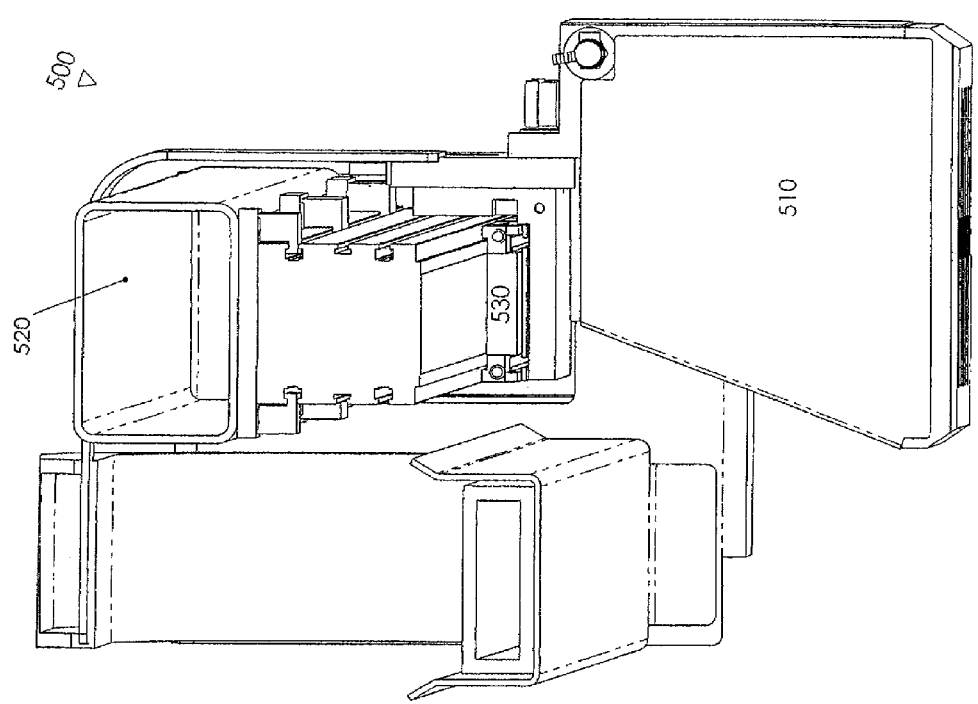
Fig. 23
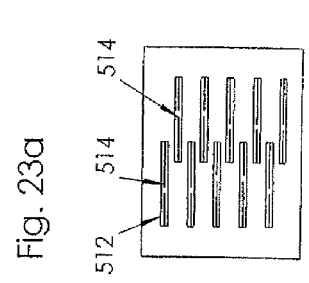
Fig. 23a

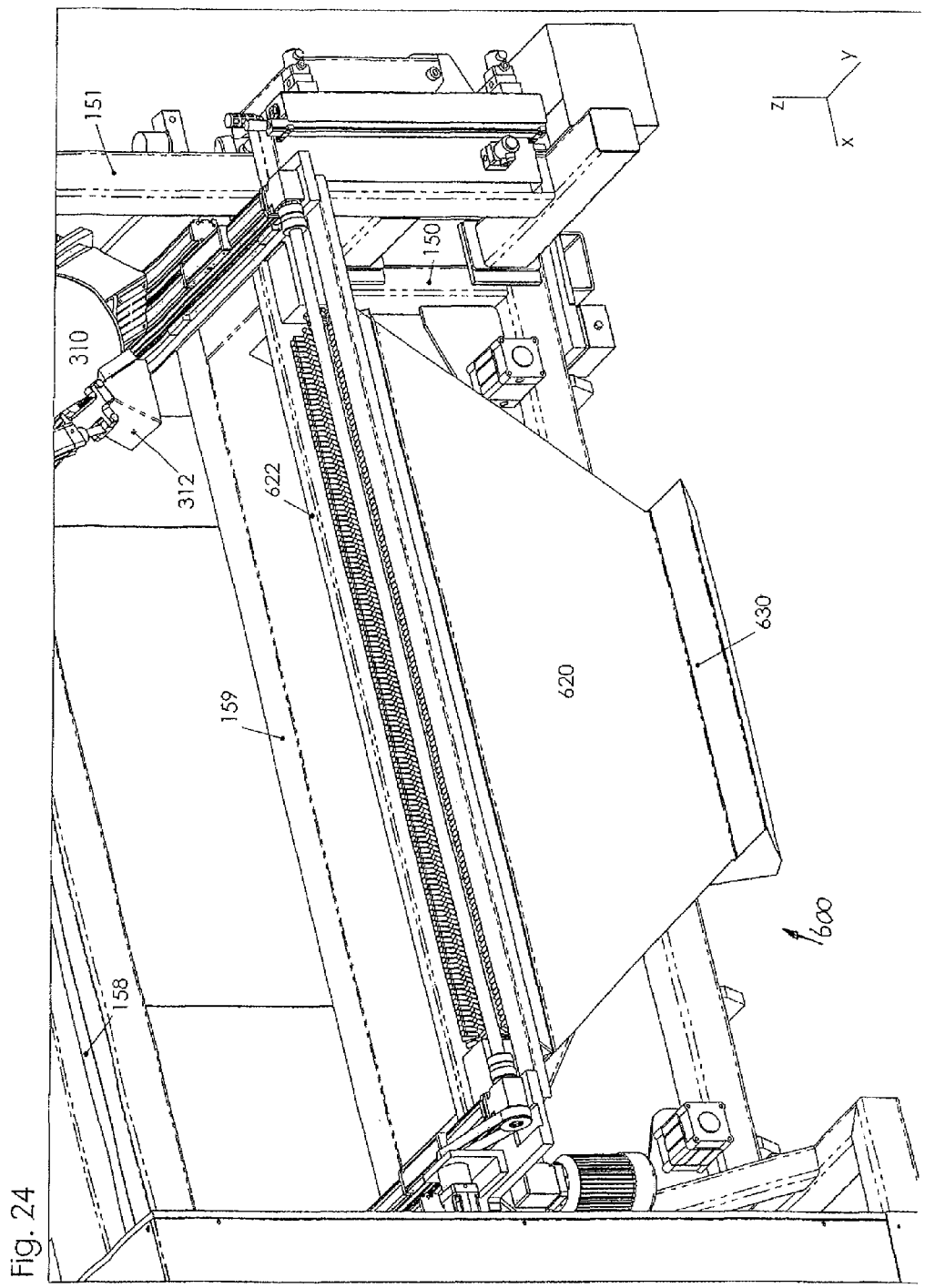

CONSTRUCTION BOX FOR A RAPID PROTOTYPING SYSTEM

CROSS-REFERENCE TO RELATED APPLICATION

This application is a National Stage entry of International Application No. PCT/EP2010/068770 filed Dec. 2, 2010, which claims priority to German Patent Application No. 10 2009 056 696.1 filed Dec. 2, 2009, the disclosure of the prior applications are hereby incorporated in their entirety by reference.

The invention relates to a construction (or building) box according to the preamble of claim 1. A construction box of this type is, for example, known from DE 20 2006 010 327 U1.

Consequently, the invention relates to a construction (or building) box for a plant or installation for the layered construction of a molded body and to a plant or installation for the layered construction of a molded body by forming layers of construction material lying on top of each other, on a construction field, and by selectively solidifying a partial area of the respective construction material layer prior to forming the next layer, the plant or installation being provided with a construction box of this type.

A plant or installation of this type (for example, a so-called rapid prototyping plant or installation) may comprise a horizontally movable coating device, by means of which uniform layers of the construction material to be solidified, for example a particulate material or a mixture including particulate material, can be applied to the construction field in multiple repetitions, for which purpose the coating device is displaceable horizontally across the construction field.

The respective layer is solidified in a selective partial area thereof after having been applied, so that the molded body is constructed from the selectively solidified partial areas. For example, a printing device having a print head being displaceable along a print head carrier in a first horizontal direction may be used for selectively solidifying the partial area of the respective construction material layer, the print head carrier itself being displaceable in a second horizontal direction, so that the print head is displaceable across the construction field in a meandering pattern, for example. The print head comprises a plurality of nozzles through which a suitable, flowable, especially liquid treatment agent (such as, for example a binding agent, for example a resin) can be applied/printed onto the layer to be selectively solidified in a controlled manner, which contributes to the selective solidification of the partial area. The so-called laser-sintering is an alternative to such a printing method, where the selective solidification of the partial area of the respective layer is obtained by the directed supply of heat by means of a laser.

The construction field to which the individual construction material layers are applied from the coating device in multiple repetitions may, for example, be formed by a construction platform, for example a height-adjustable construction platform which is received in the interior space of a construction box open to the upper side. When using a height-adjustable construction platform, said construction platform may, for example, be moved upwards at the beginning of a construction process for constructing a molded body. A first construction material layer is applied to the construction platform moved upwards by means of the coating device, whereupon the applied layer is solidified selectively in a pre-determined partial area, for example by means of a printing device. Once the first construction material layer has been solidified selectively, the construction platform is lowered by one layer thickness, whereupon a second construction material layer is applied to the construction platform or rather to the first construction material layer solidified selectively before, by means of the coating device. Then, the second construction material layer is solidified selectively and the construction platform is one again lowered by one layer thickness. These steps are repeated until the molded body is produced from the selectively solidified layers. In order to unpack the completed molded body, the construction platform may simply be displaced upwards again, so as to remove the molded body from the loose and unsolidified construction material.

Alternatively, methods/devices are known from the state of the art where the construction platform is not moved, i.e. is stationary during the construction process, and where the coating device and the printing device are lifted successively, in order to keep the vertical distance constant between the coating device/printing device and the construction field.

The construction box may, for example, be mounted in a stationary manner on the frame/construction frame of the installation. Alternatively, the construction box may be formed as an exchangeable container (=a so-called interchangeable container), i.e. several interchangeable containers are provided per installation, so that during the unpacking process of a molded part that has been constructed in a first interchangeable container, another molded part can already be constructed in a second interchangeable container. An interchangeable container is, for example, described in DE 20 2006 010 327 U1 and in DE 100 47 615 A1.

According to DE 20 2006 010 327 U1, an interchangeable container may be provided with recesses through which a fork lift may grip, in order to move the interchangeable container into a station of the installation or out of the same.

According to DE 100 47 615 A1, an interchangeable container may be provided with a transporting eye which enables the transport of the interchangeable container by means of a crane.

DE 100 47 614 A1 and DE 100 49 043 A1 each disclose a roll path by means of which an interchangeable container can be brought into the installation and can be brought out of the installation.

The construction box is arranged in the frame/construction frame of the installation for constructing the molded body, and is, for example, fixed thereto (=construction box construction position). For example, in the construction box construction position, the construction area in which the molded part is constructed may be surrounded on its circumferential side by a so-called horizontal construction area cover or a horizontal construction area boundary in the manner of a frame. For example, an installation-fixed, horizontal, frame-shaped construction area boundary fixed to the construction frame of the installation is used in the state of the art for this purpose. The horizontal construction area boundary is arranged at a height that is significantly greater than the height of the construction box, so that the construction box can be moved without any problems into the construction box construction position and under the horizontal frame-shaped construction area boundary at the beginning of the construction process. Subsequently, the entire construction box is lifted by an amount that corresponds to the difference between the height of the horizontal construction area boundary and the height of the construction box, so that the upper edge of the construction box is at the height of the horizontal construction area boundary and is surrounded thereby on its circumferential side. Then, the first construction material layer is applied to the construction platform moved upwards by means of the coating device. Excessive construction material is collected on the construction area cover or on the construction area boundary during the construction process.

It is an object of the invention to provide a construction box and a rapid prototyping installation having such a construction box, the construction box being easy and reliable to use.

For this purpose, the present invention provides a construction box in accordance with claim 1 and an installation for the layered construction of a molded body, comprising a construction box of this type.

The construction box comprises a front wall, a rear wall and two lateral walls which together limit a construction box interior space. A construction platform is received in the construction box interior space, which is, for example, height-adjustable. The construction box may, for example, be formed to be rectangular in a top view.

According to the invention, the construction box is provided with its own construction box travel drive integrated into the construction box, by means of which the construction box is movable between a construction box construction position in which the construction box is arranged in the frame/construction frame of the installation and, for example, fixed to the construction frame, for constructing the molded body, and an additional construction box position. For example, the travel drive is formed as at least one electric motor which is arranged on the outer side of one of the construction box walls. The additional construction box position may, for example, be a construction box unpacking position in which the construction box is moved out of a construction frame of the installation and in which the constructed molded body can be unpacked.

The construction height (=the height of the construction field and of the uppermost layer, respectively) and, consequently, the height of the installation and of the construction housing, respectively, may be reduced by the integrated construction box travel drive, as the construction box can be moved by the integrated construction box travel drive into the construction position in a directed/guided manner, so that an installation-fixed limiting plate can be mounted at a low height which is greater than the height of the construction box only by a small amount. In addition, the construction box can be moved rapidly back and forth between the construction box construction position and, for example, the unpacking position, as at the beginning and at the end of the construction process, when the construction box is in the construction position, only fixing and adjusting or orienting the construction box along the construction box moving direction is required (or a releasing), i.e. the construction box can simply be moved into the construction frame, wherein the construction job can be started immediately upon the fixing and adjusting/orienting process along the moving direction. Moreover, the construction box can be moved into the construction frame or the construction position and out of the same in a controlled and automated manner, for which purpose the construction box travel drive may, for example, be connected to a central controller/regulation device. A complex separate device for moving the construction box in and out can be dispensed with.

The construction box travel drive may, for example, comprise at least an upright or lying gearwheel fixed to the construction box, which can be driven by a construction box travel motor integrated into the construction box. Several travel motors, for example electric motors, can be provided as a travel drive, which are controlled or coupled for synchronous operation. The drive motor may, for example, be attached to the front side of the construction box, for example in a front intermediate space that is formed between the front wall and a front encasement wall. The gearwheel may, for example, be attached to the construction box lower side. Alternatively, the gearwheel may also be attached to a side wall of the construction box, for example in a lower area of the side wall at the outer side thereof. The gearwheel may, for example, have a vertical wheel plane or, for example, a horizontal wheel plane. For example, several gearwheels may be attached to the construction box, which are driven by a common travel motor by means of a transmission or by separate travel motors running synchronously. The gearwheel fixed to the construction box may cooperate with a rack. For this purpose, the gearwheel may be engaged with the rack and roll off the rack when driven by the travel motor, so that the construction box is movable along the rack. In this respect, the construction box may be connected to the installation electrically by means of a drag chain or a rolling cable chain, for example with a central controller which controls, amongst others, the construction box travel drive of the construction box, and/or with a central electric power supply of the installation. However, for supplying the construction box travel drive with electric power, the construction box may also be provided with an accumulator, for example. The rack may, for example, comprise a lateral toothed surface with which a gearwheel with a horizontal wheel plane is engaged laterally. The rack may, for example be arranged between two roll or slide rails, for example adjacent to one of the two roll or slide rails of a rail system, along which the construction box may roll or slide by means of skids. Alternatively, the rack may, for example, also be formed by one of the two roll or slide rails on which the construction box is standing, for which purpose the lateral surface of the roll or slide rail is provided with teeth.

The construction box may, for example, comprise lateral guide rolls. These guide rolls may, for example, be fixed to the lower side of the construction box. Alternatively, the guide rolls may also be attached to one of the two lateral walls of the construction box. The guide rolls have, for example, a vertical roll axis. The guide rolls attached to the construction box may cooperate with two guide rails where the guide rolls roll off. One of the two guide rails may, for example, be formed by the rack, i.e. by the lateral surface of the rack opposite the toothed surface, i.e. by the outer lateral surface of the rack, the inner lateral surface of the rack being formed as a toothed surface. The other guide rail may, for example, be formed by one of the two above-mentioned roll or slide rails, for example by an inner or outer lateral surface of the rail. For example, both guide rails may also be formed by the roll or slide rails, or two separate guide rails may be provided. A centering of the construction box along a horizontal direction perpendicular to the travel direction may be effected with the guide rolls, so that the construction box can be driven into the construction position in a directed way. A separate centering/fixing of the construction box in the construction box construction position along the horizontal direction perpendicularly to the travel direction can therefore be dispensed with.

The construction box may, for example, comprise two or more slide or roll skids with which the construction box rests on corresponding rails of a rail system in a sliding/rolling manner. The rails of the rail system may, for example, be roll-off rails, i.e. may comprise rolls on which the skids roll. Alternatively, the rails of the rail system may, however, also be slide rails, i.e. may comprise slide surfaces on which the slide skids slide.

The construction box may, for example, comprise a tapering alignment recess on one of the two lateral walls, for example a cone-shaped recess. An alignment member that is adjustable horizontally perpendicular to the travel direction of the construction box may, for example be attached to the frame/construction frame of the installation, which comprises a tapering end portion (for example an alignment mandrel, for example a cone-shaped mandrel), which is laterally engaged with the recess of the side wall in the construction box construction position. The alignment recess of the construction box and the installation-side adjustable alignment member together form a construction box fixing system for aligning the construction box along the construction box travel direction and for fixing the construction box to the construction frame. In addition, the construction box fixing system may comprise a installation-side fixing member (for example a bolt) having an end portion formed to be flat, which can adjustably be pressed against a small stopper plate attached to the construction box wall. A rail on the opposite construction box side may, for example, serve as a counter bearing. In addition, the construction box fixing system may comprise a sensor for detecting the position of the construction box, and especially for detecting, whether the construction box is in the construction position. For this purpose, a sensor target may be attached to the construction box. In addition, the construction box fixing system may comprise a control system which controls a drive of the alignment member and of the fixing member in such a manner that the alignment member moves into the alignment recess and the fixing member is pressed against the small stopper plate when the sensor detects that the construction box is in the construction position.

In addition to the integrated construction box travel drive, the construction box may comprise its own construction platform lift drive integrated into the construction box, for example in the form of one or more electric motors, for raising or lowering the construction platform. The lift drive may, just like the travel drive, be supplied with electric current by the drag chain line for electric power supply and/or may be connected to a central controller/regulation device. For example, the construction platform lift drive may be arranged in the front spacing together with the construction box travel drive.

The construction platform lift drive integrated into the construction box may be used both during the construction process, when the construction box is in the construction position, and during the unpacking process of the completed molded or shaped body, when the construction box is in the unpacking position, so that a separate motor for unpacking can be dispensed with. In addition, the construction platform does not have to be lowered to the bottom dead center upon completion of a construction job and prior to its displacement out of the construction frame and into the unpacking position as it is the case with installations where the lift drive is mounted on the installation frame, but can be moved by the construction box side travel drive to the unpacking position directly upon completion of the molded body and upon releasing the fixation along the travel direction, in which the construction platform is raised by the construction box side lift drive. Hence, also time can be saved by arranging the construction platform lift drive and the construction box travel drive on the construction box.

In addition, the invention provides an installation for the layered construction of a molded body, which comprises a construction box and a rail system according to the invention, along which the construction box is movable between the construction box construction position and the additional construction box position by means of the construction box travel drive.

The installation may, for example, comprise a construction housing which surrounds the construction frame of the installation including the construction field, the coating device and the printing device. The construction housing comprises a construction box move-in/move-out opening through which the construction box is movable between the construction box construction position in which the construction box is arranged in the construction housing and the additional construction box position in which the construction box is arranged outside the construction housing. In this respect, the construction box construction position may be chosen such that the construction box move-in/move-out opening is closed by the rear side of the construction box in the construction box construction position, so that no additional door and/or protection device is/are required.

The installation according to the invention may, for example, be operated in a so-called simple shuttle operation where a single installation-fixed construction box according to the invention is moved back and forth between the construction box construction position and the additional construction box position along the rail system which extends correspondingly far from the one and/or the other side of the construction housing.

However, according to a modified embodiment, a so-called double shuttle operation may be provided as well. In this case, the installation comprises a first construction box according to the invention and a second construction box according to the invention, the first construction box being movable on and along the rail system between a first construction box unpacking position and a common construction box construction position, and the second construction box being movable on and along the rail system between a second construction box unpacking position and the common construction box construction position. In this respect, the first construction box unpacking position and the second construction box unpacking position are arranged on opposite sides of the construction frame, the construction frame respectively comprising a construction box opening on the opposite sides, through which the corresponding construction box is movable.

Figure 2:
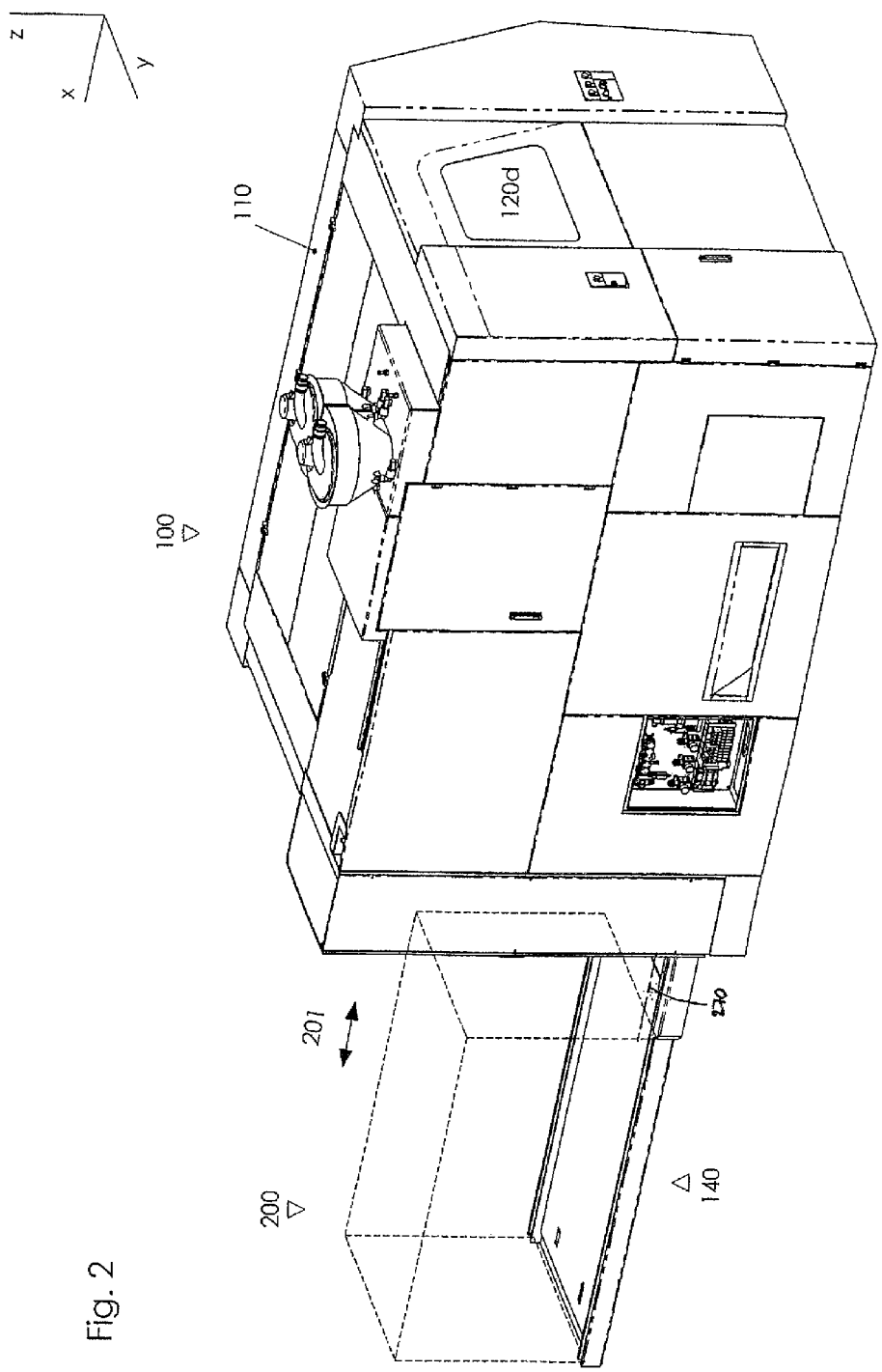
Figure 3:
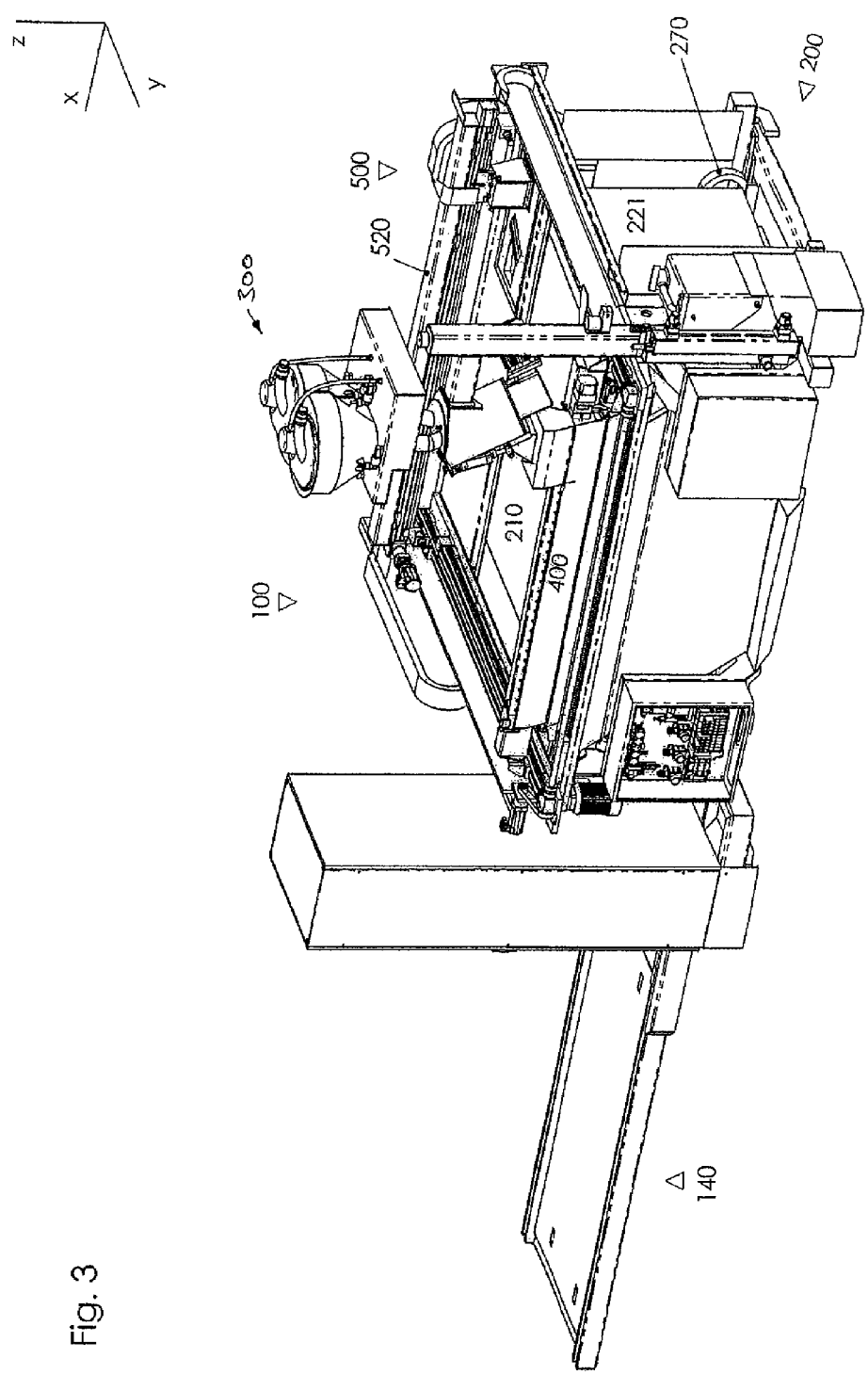
Figure 4:
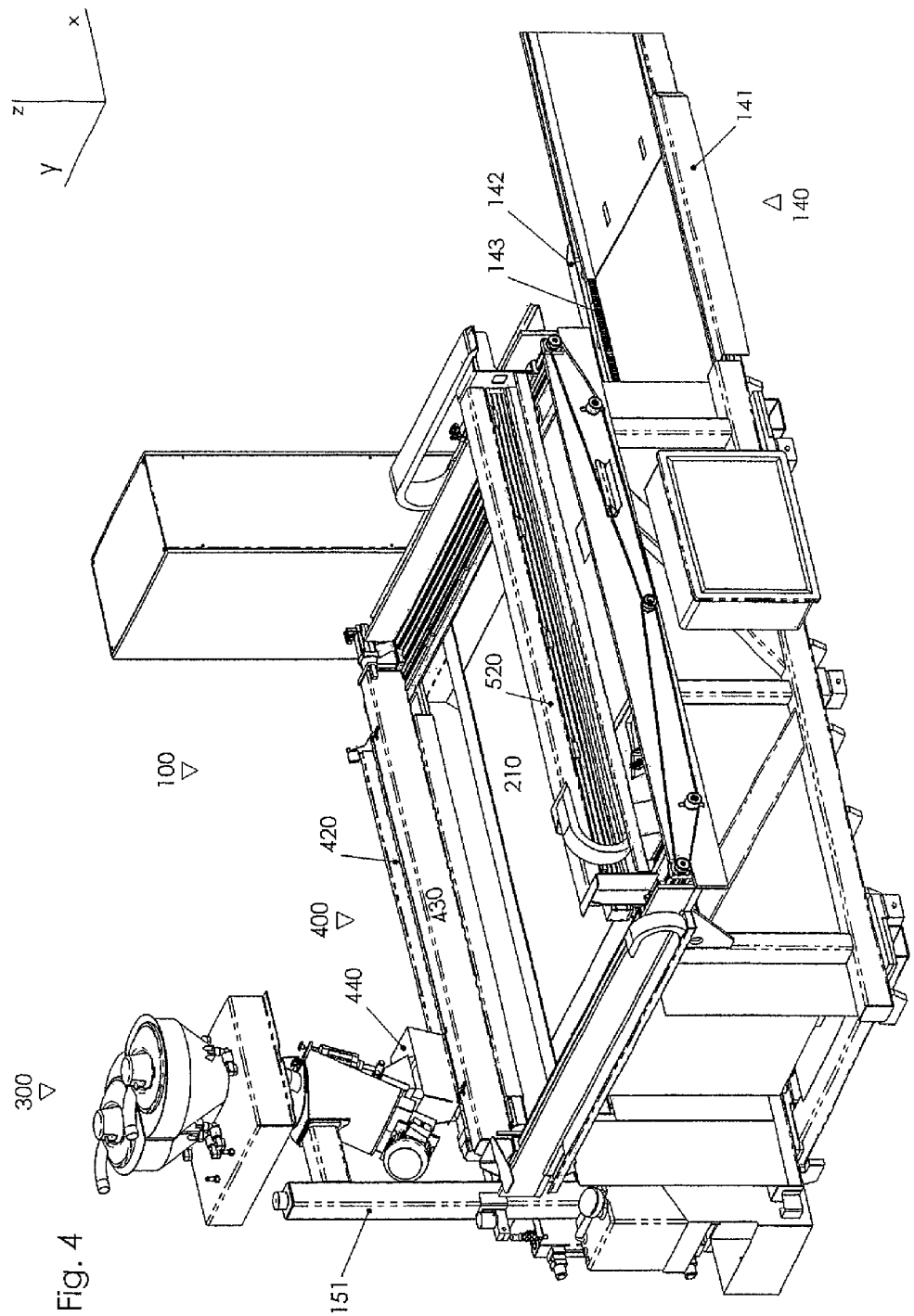
Figure 5:
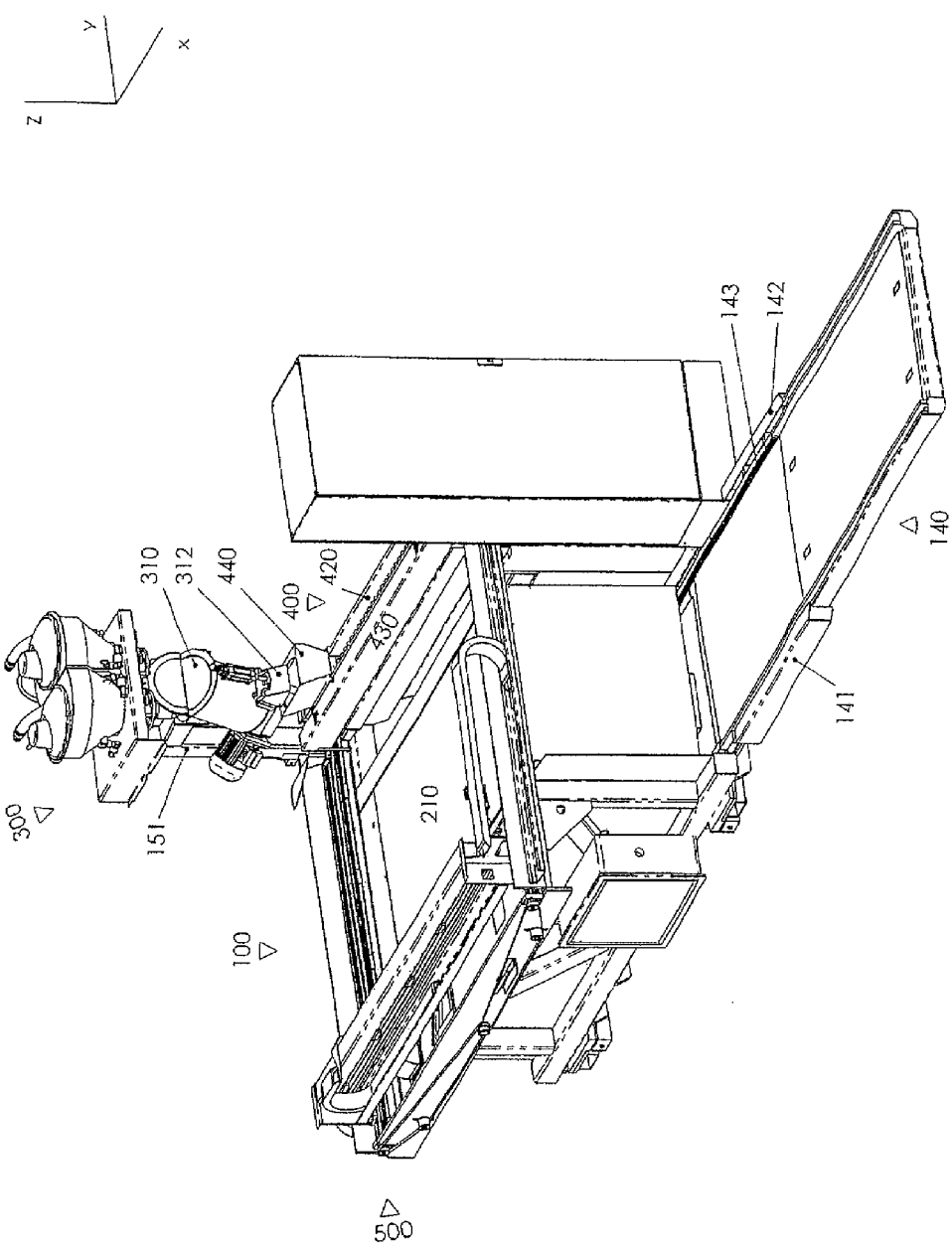
Figure 6:
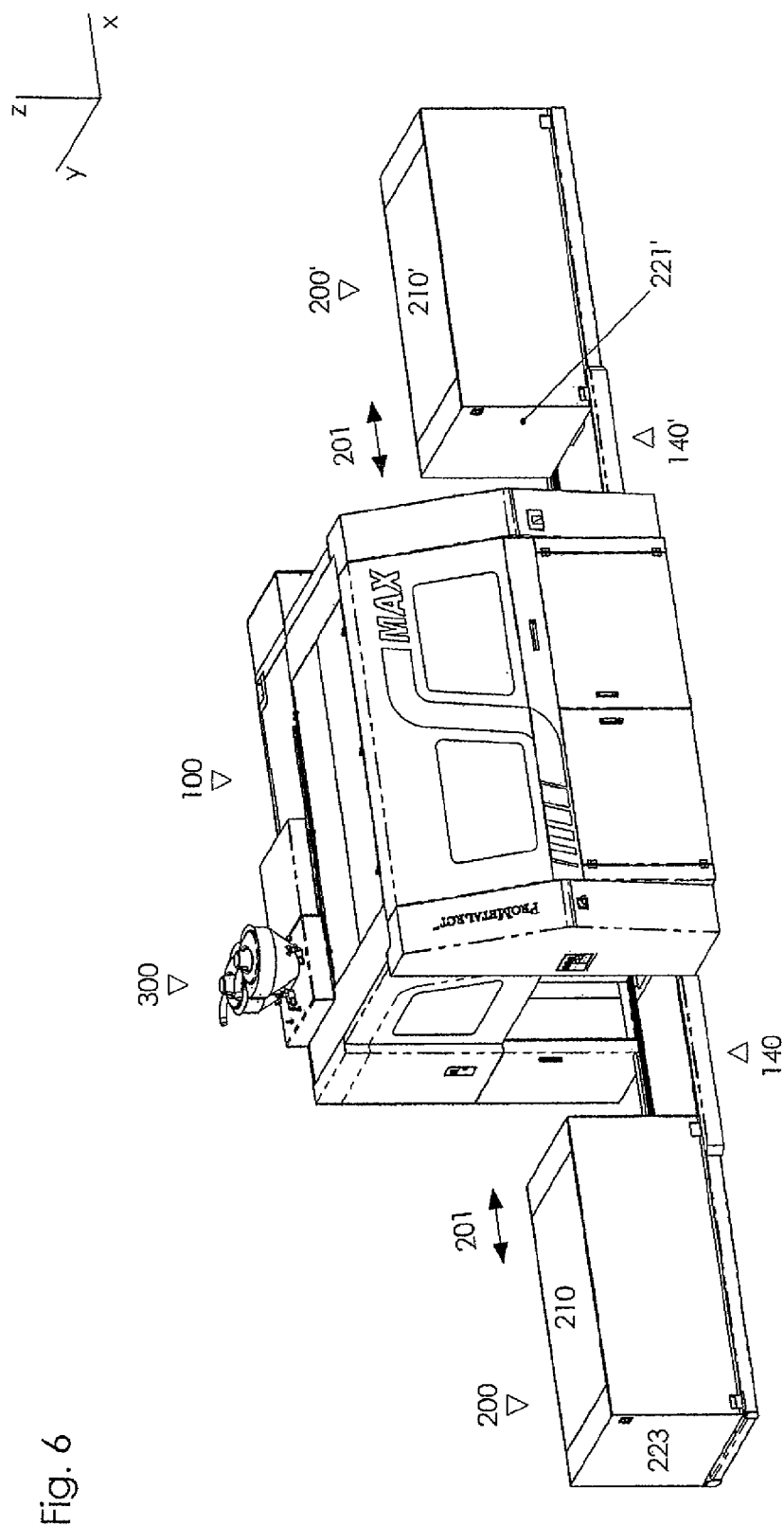
Figure 7:
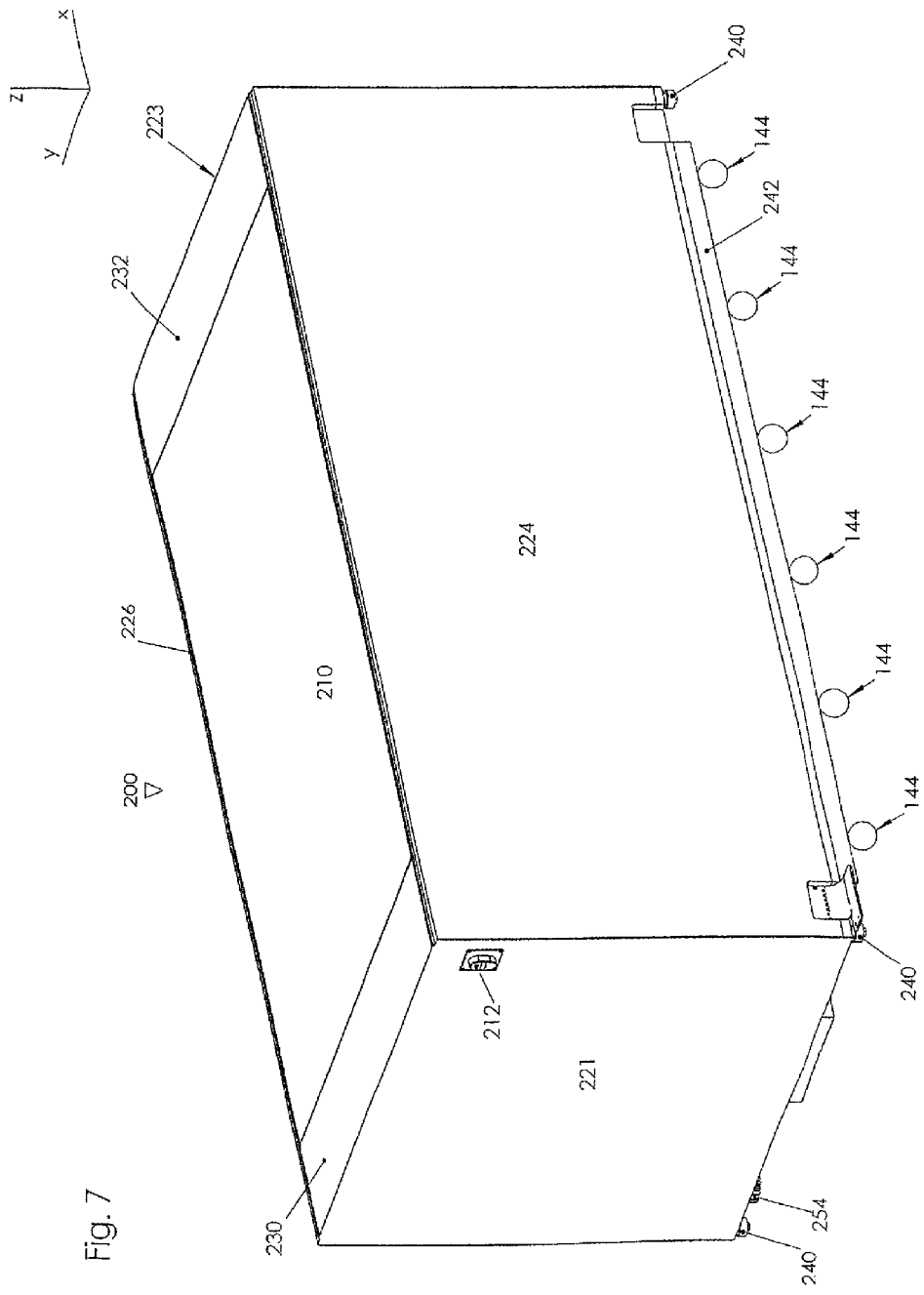
Figure 8:
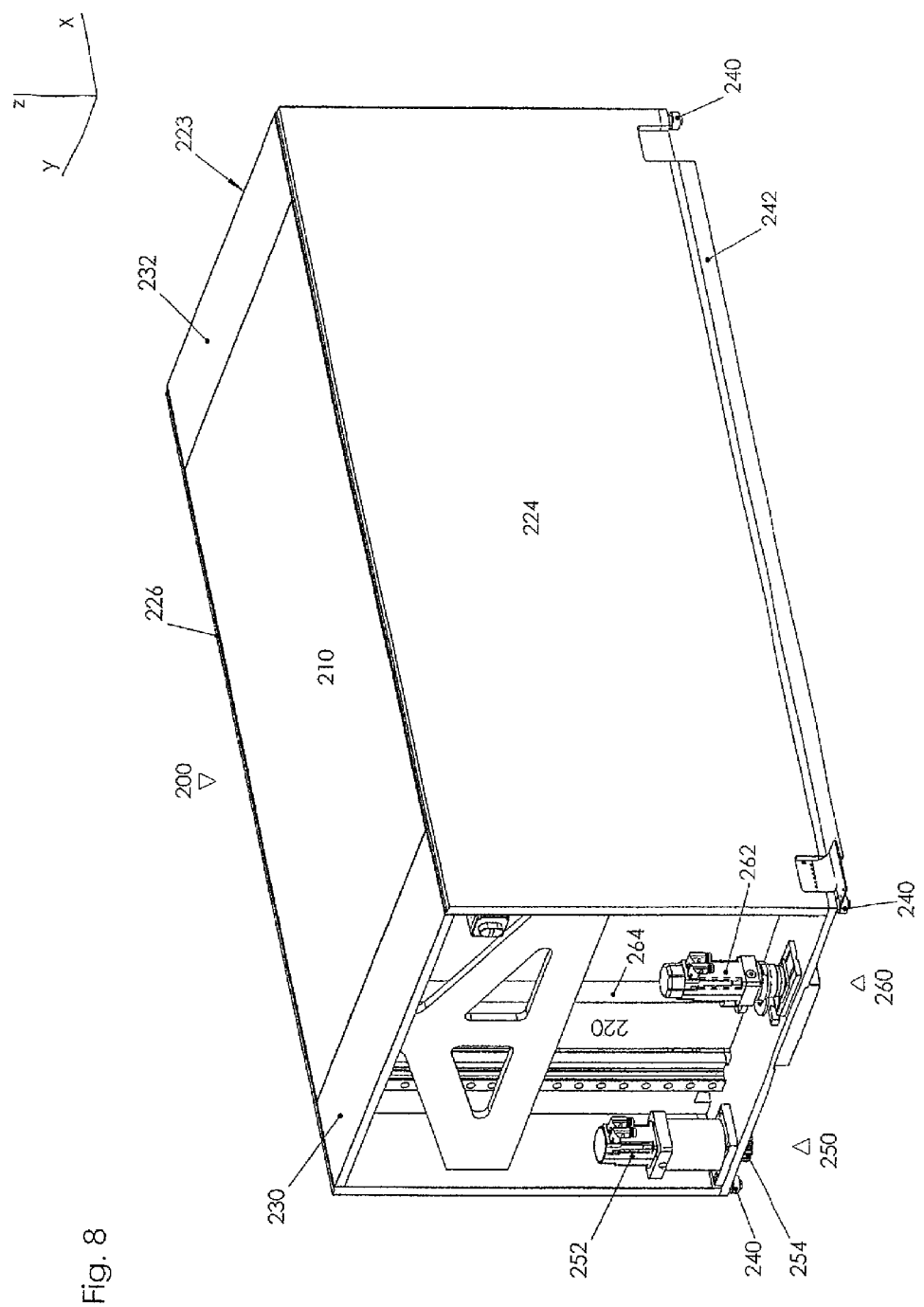
Figure 9:
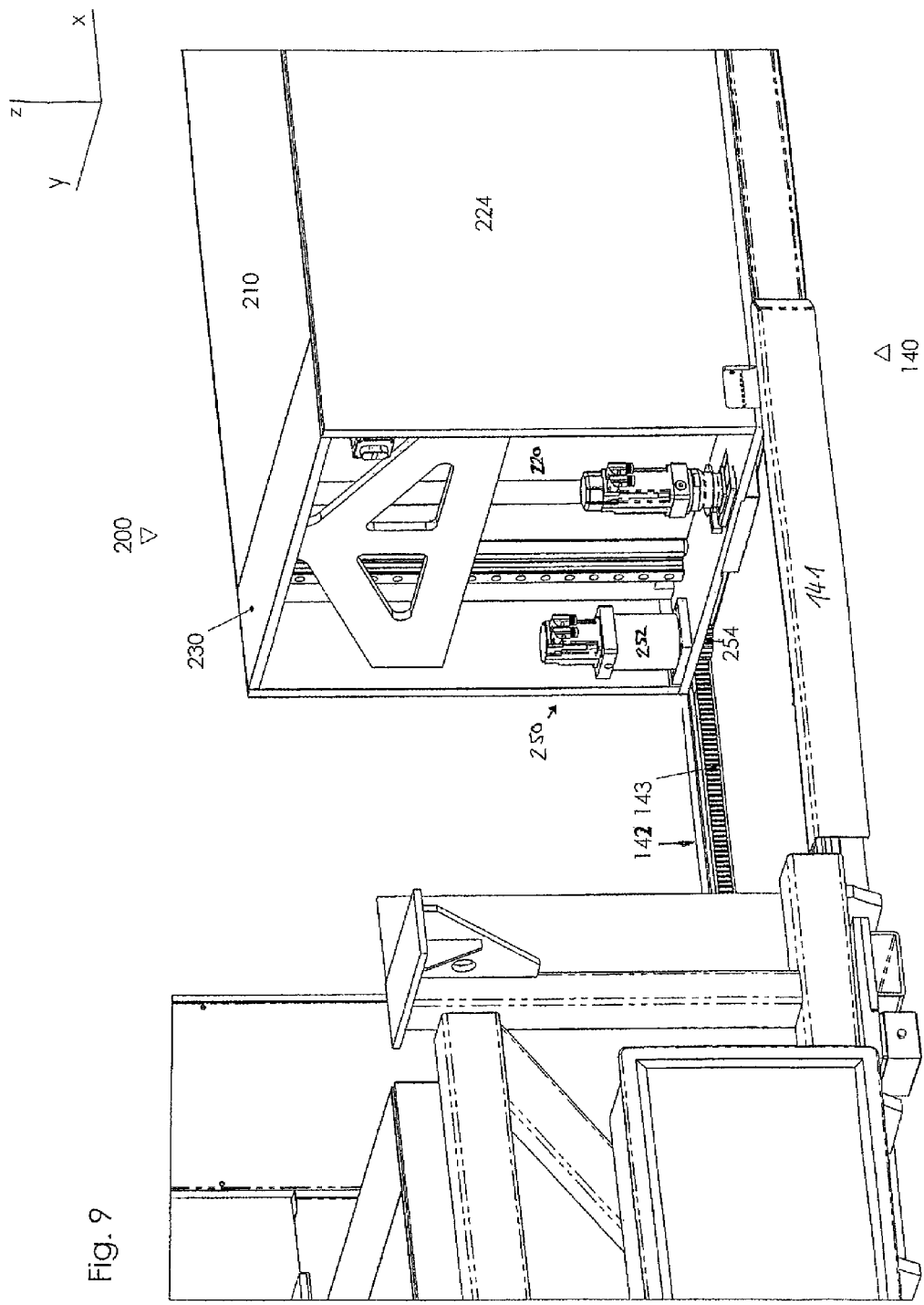
Figure 10:
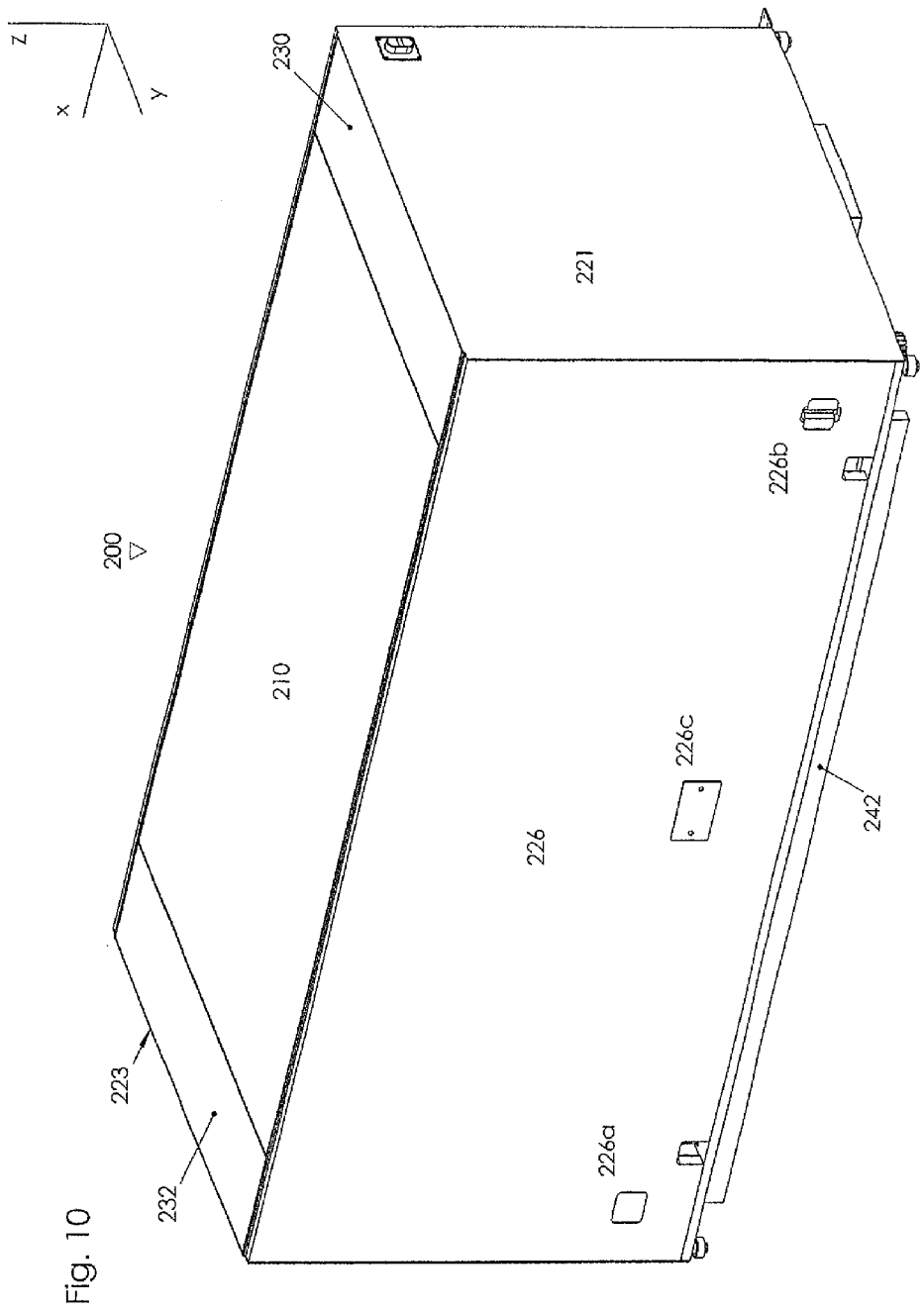
Figure 11:
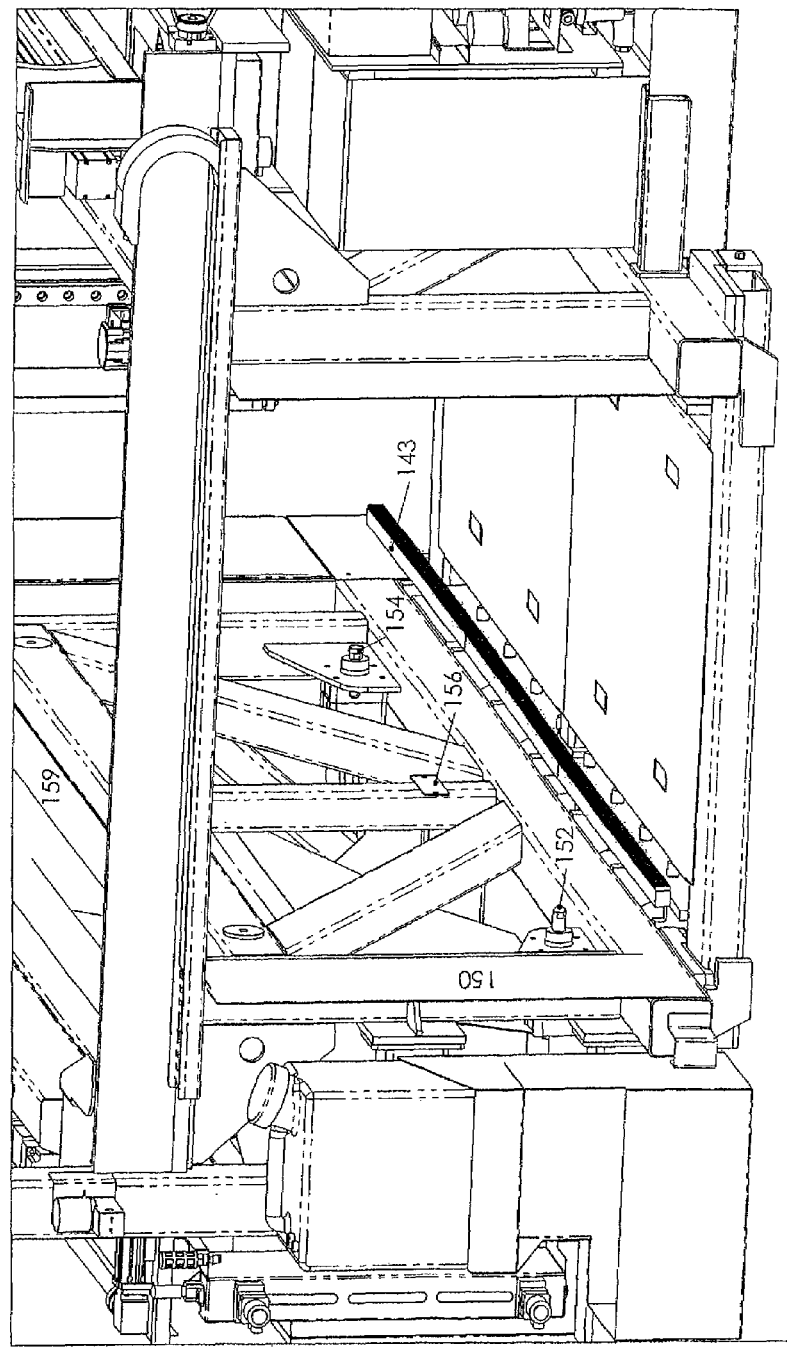
Figure 12:
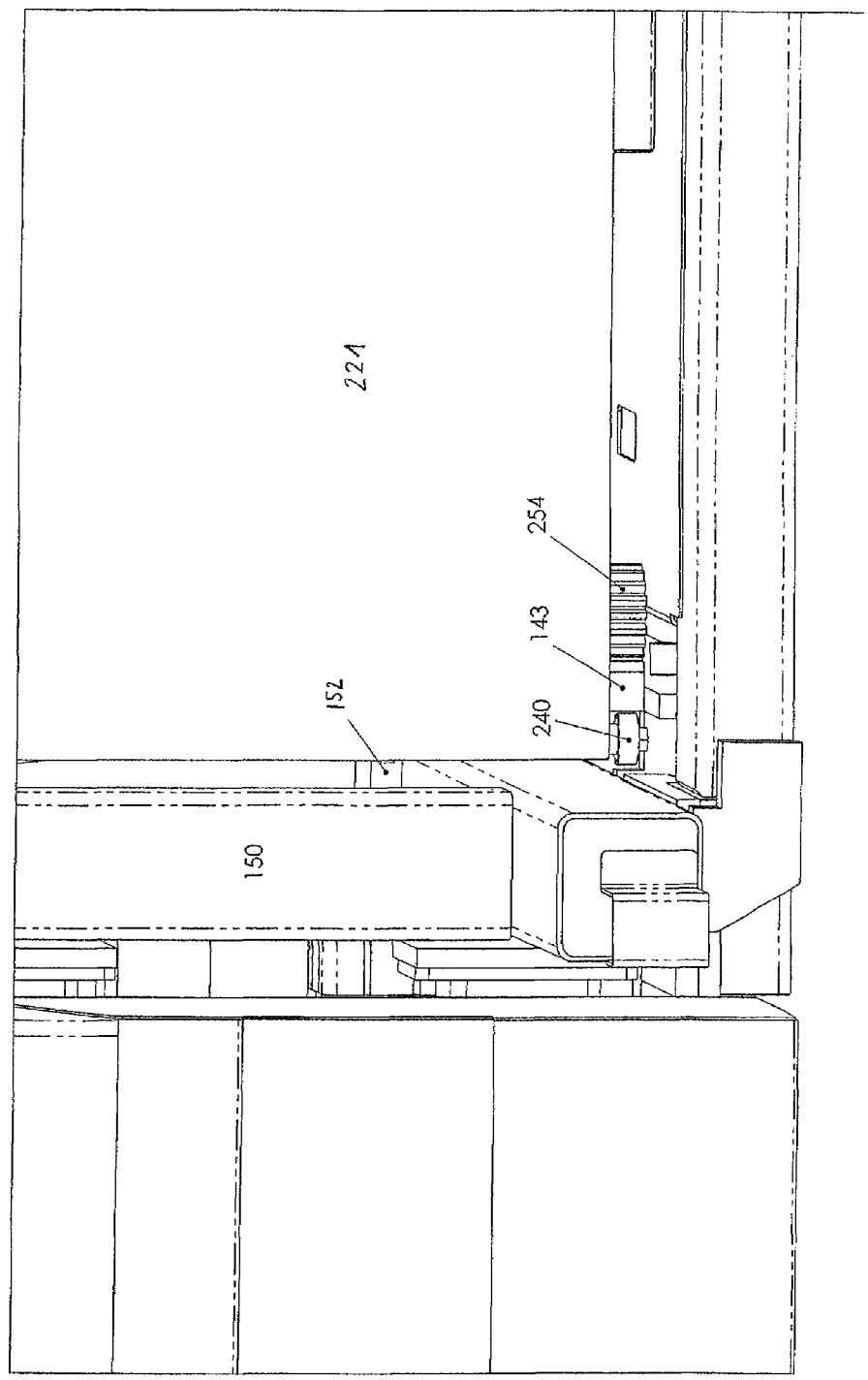
Figure 13:
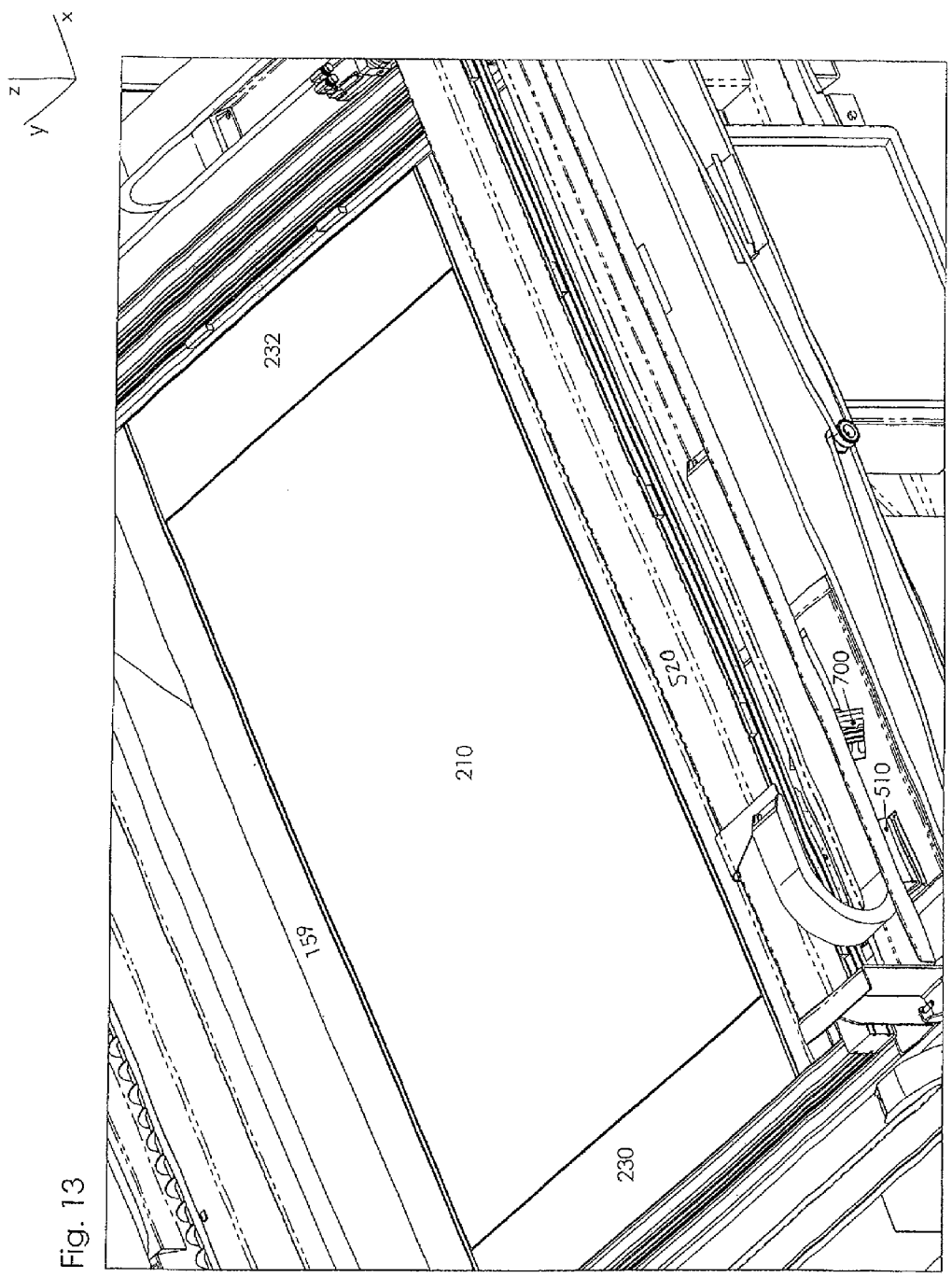
Figure 14:
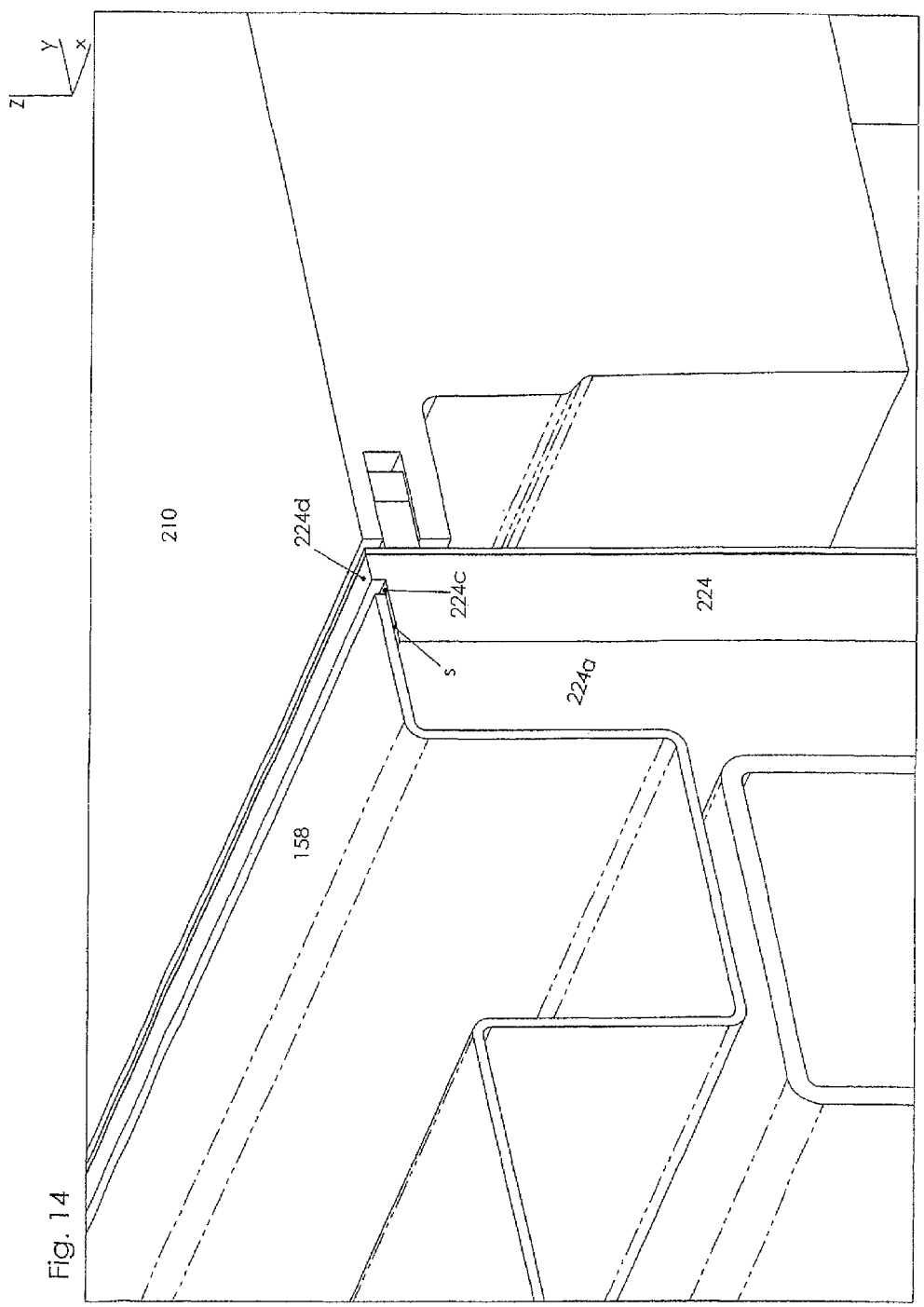
Figure 15:
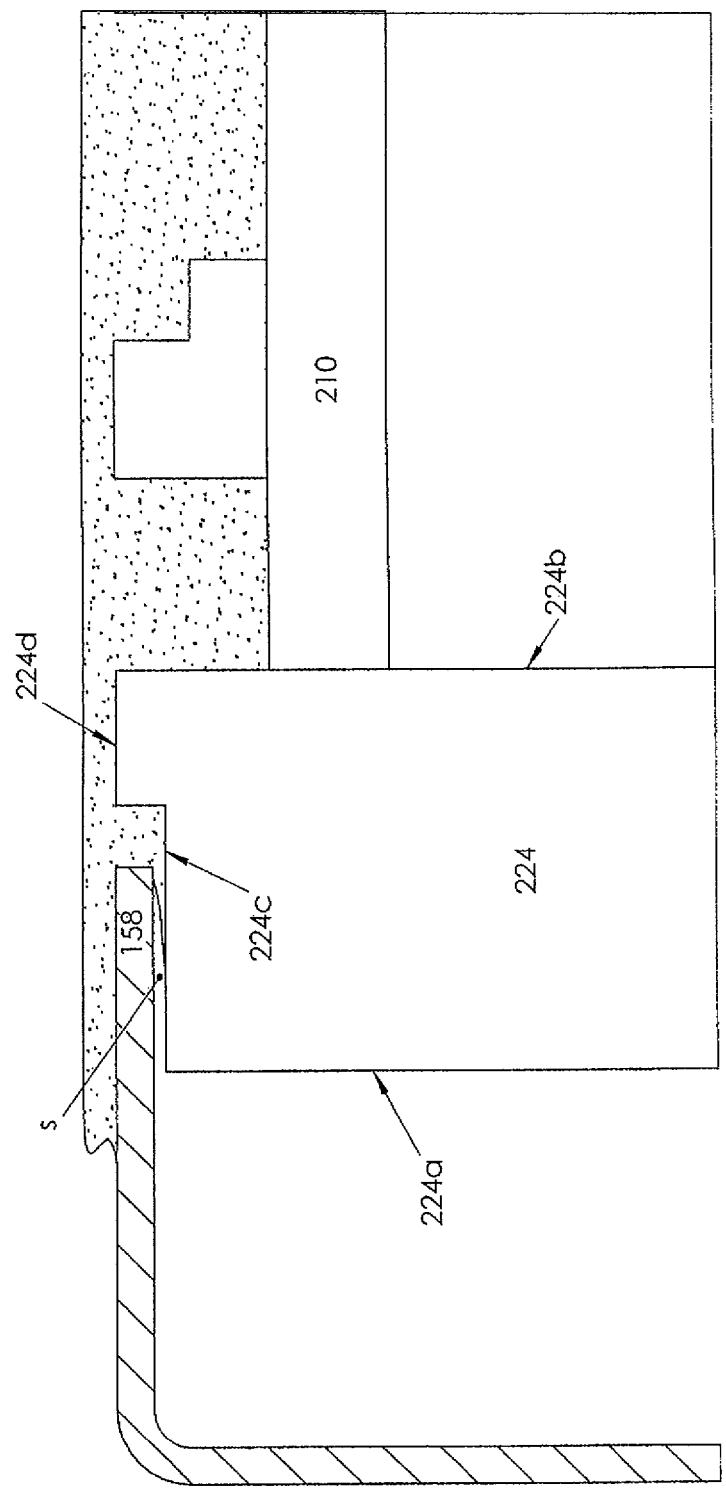
Figure 16:
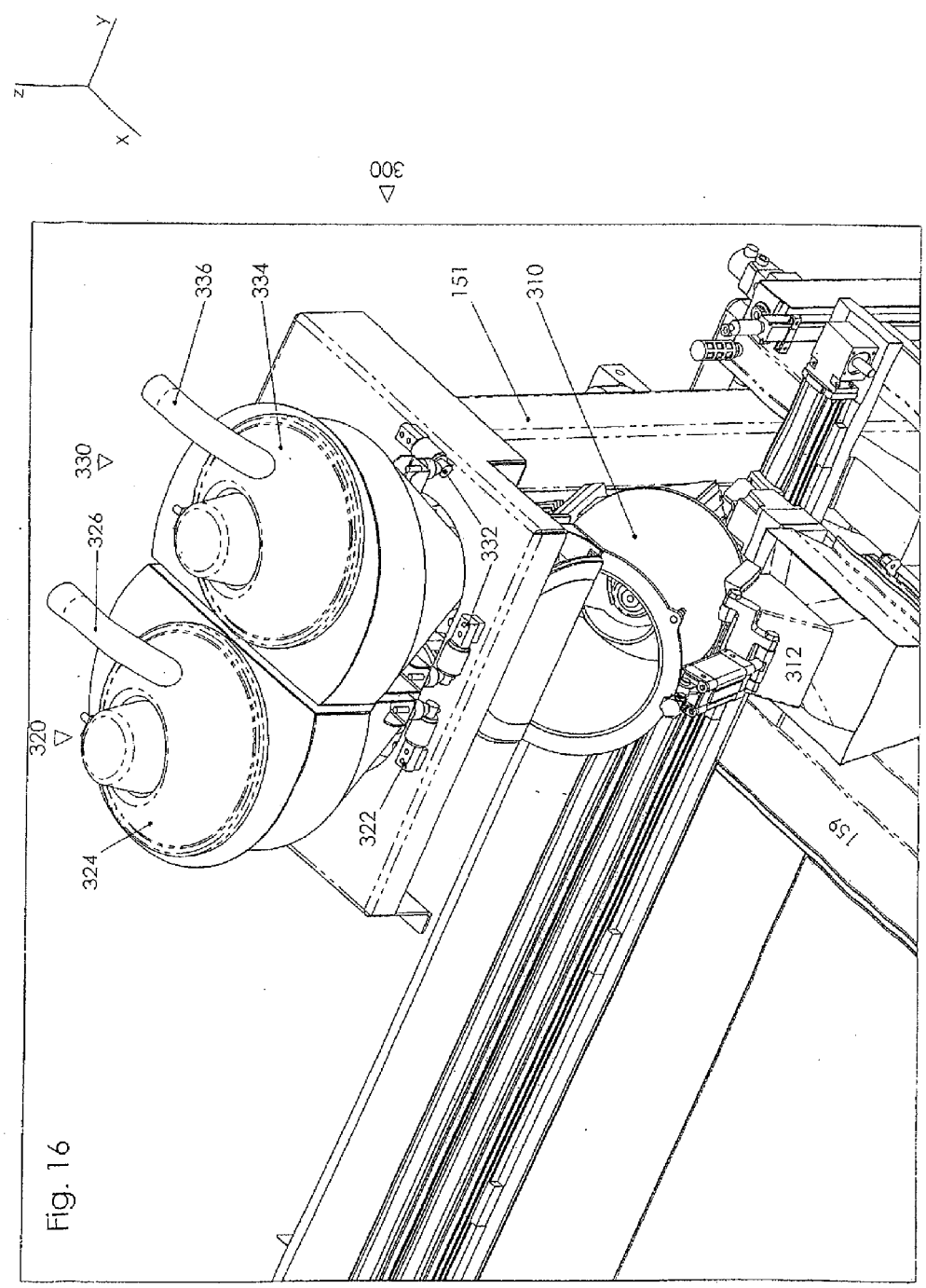
Figure 17:
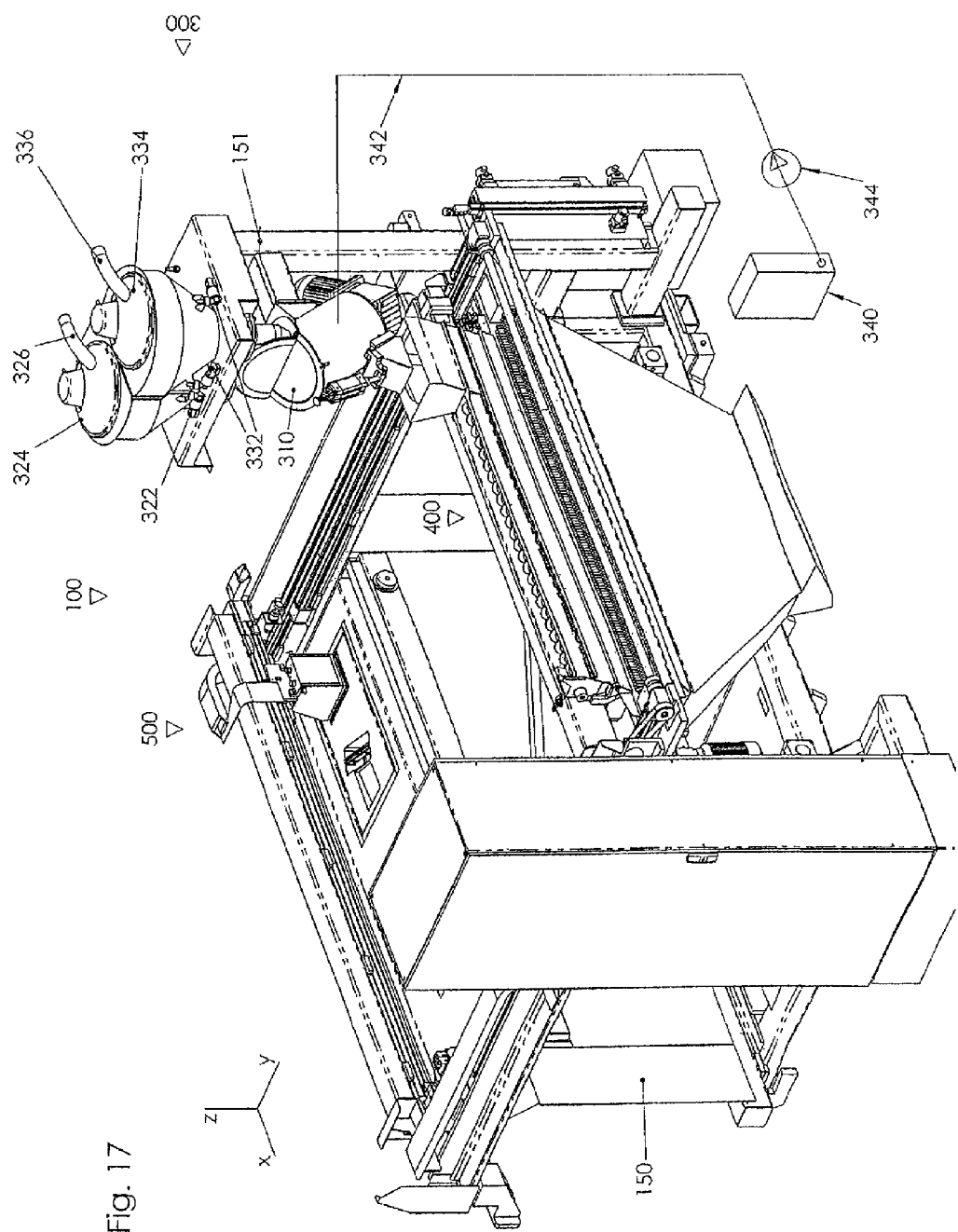
Figure 18:
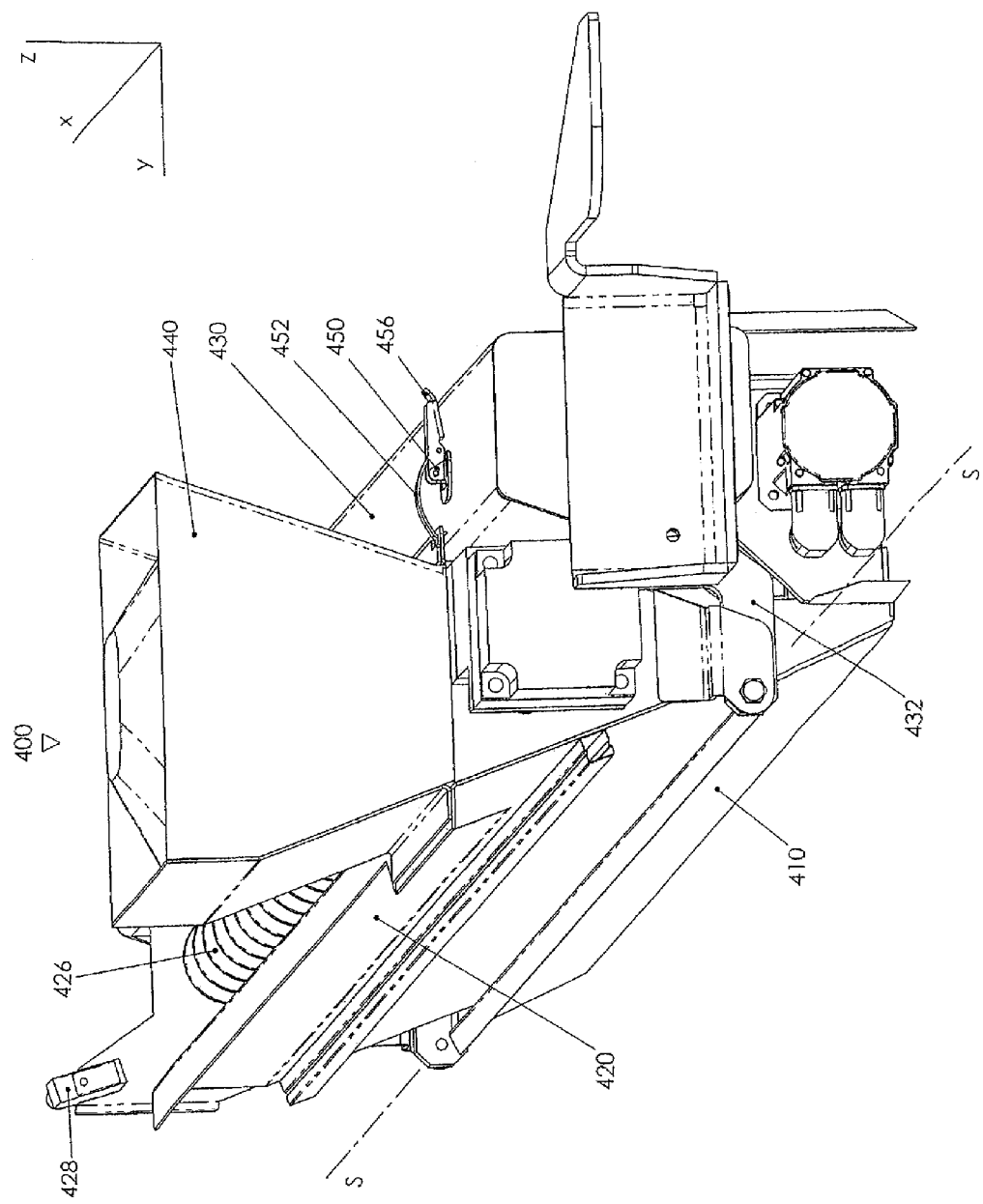
Figure 19:
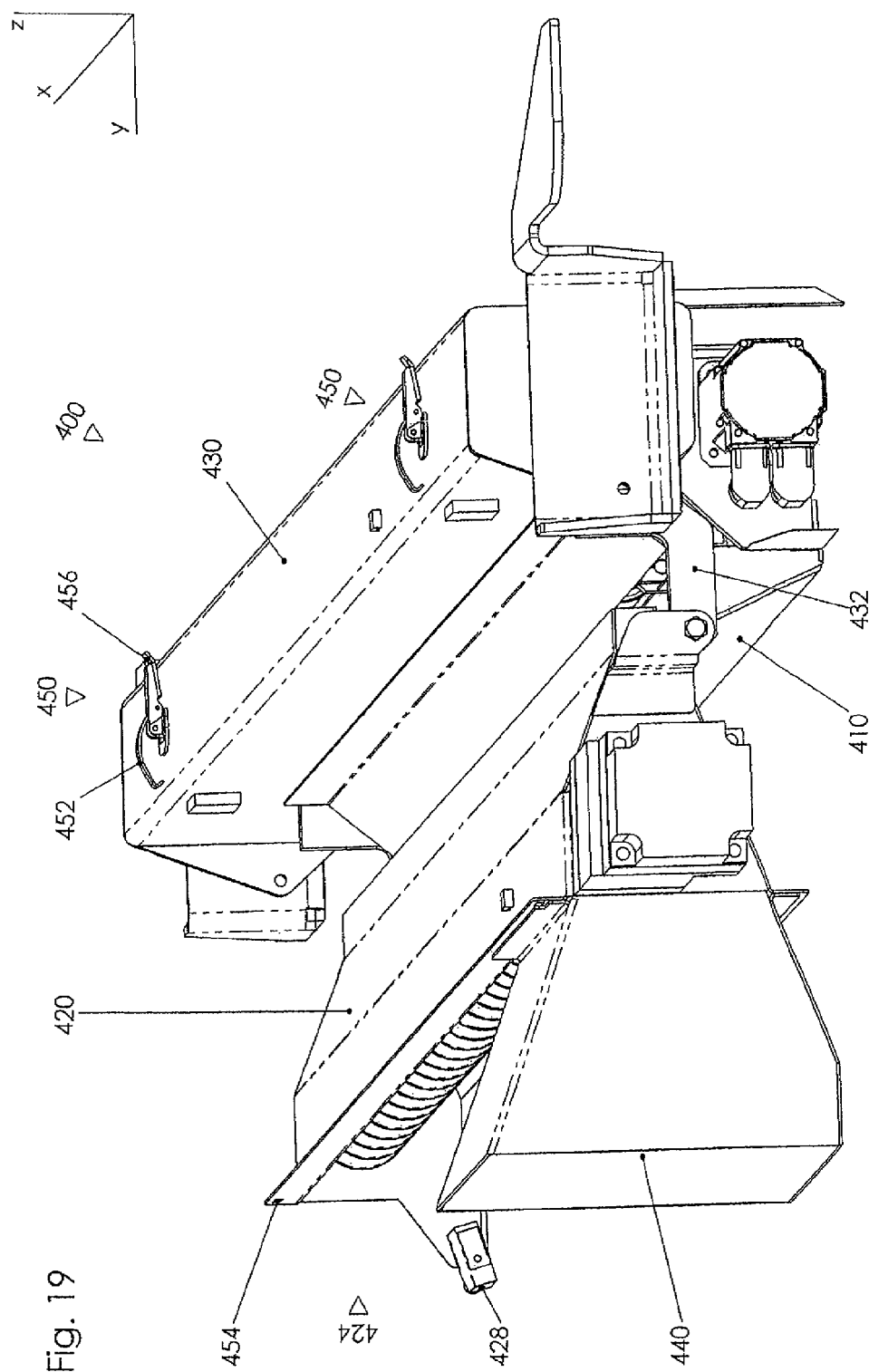
Figure 20:
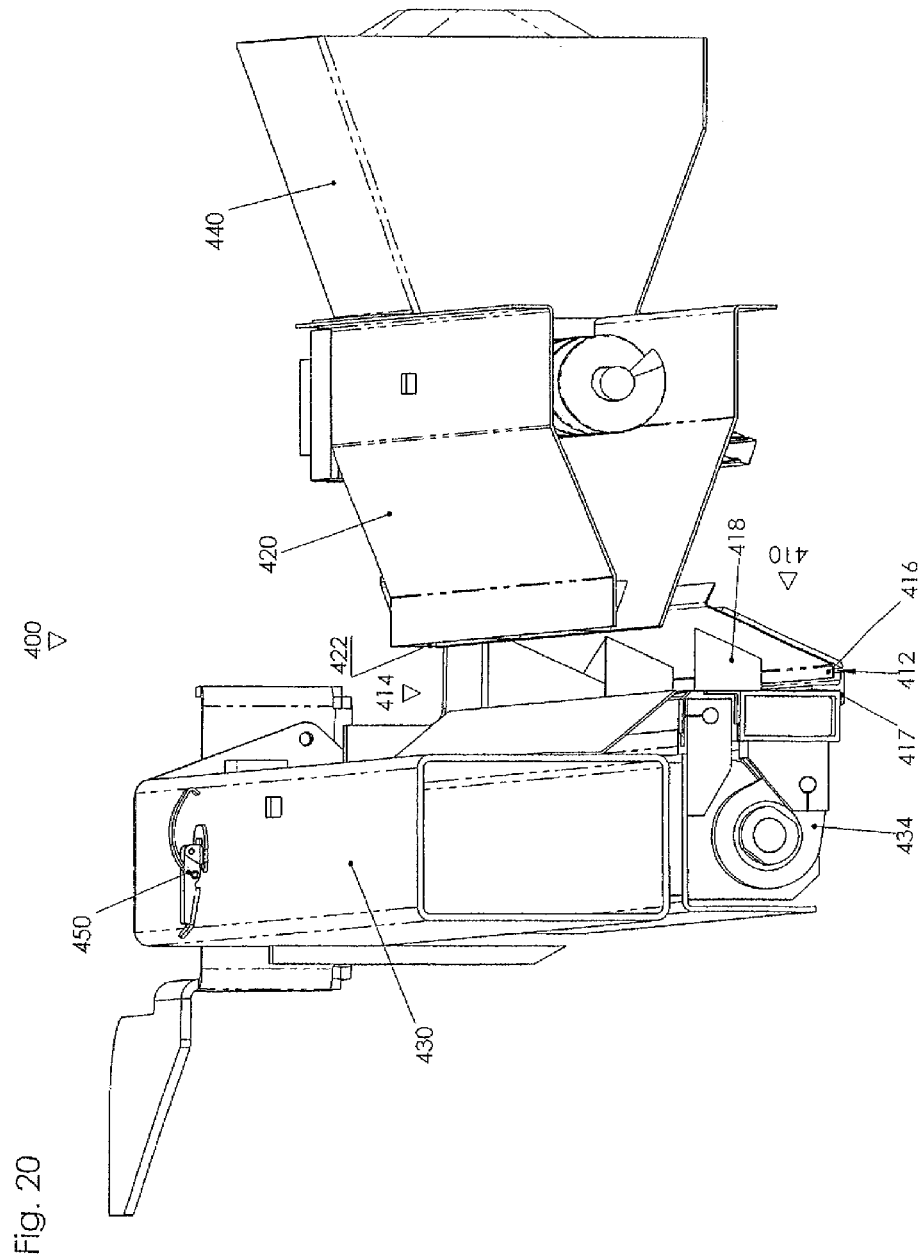
Figure 21:
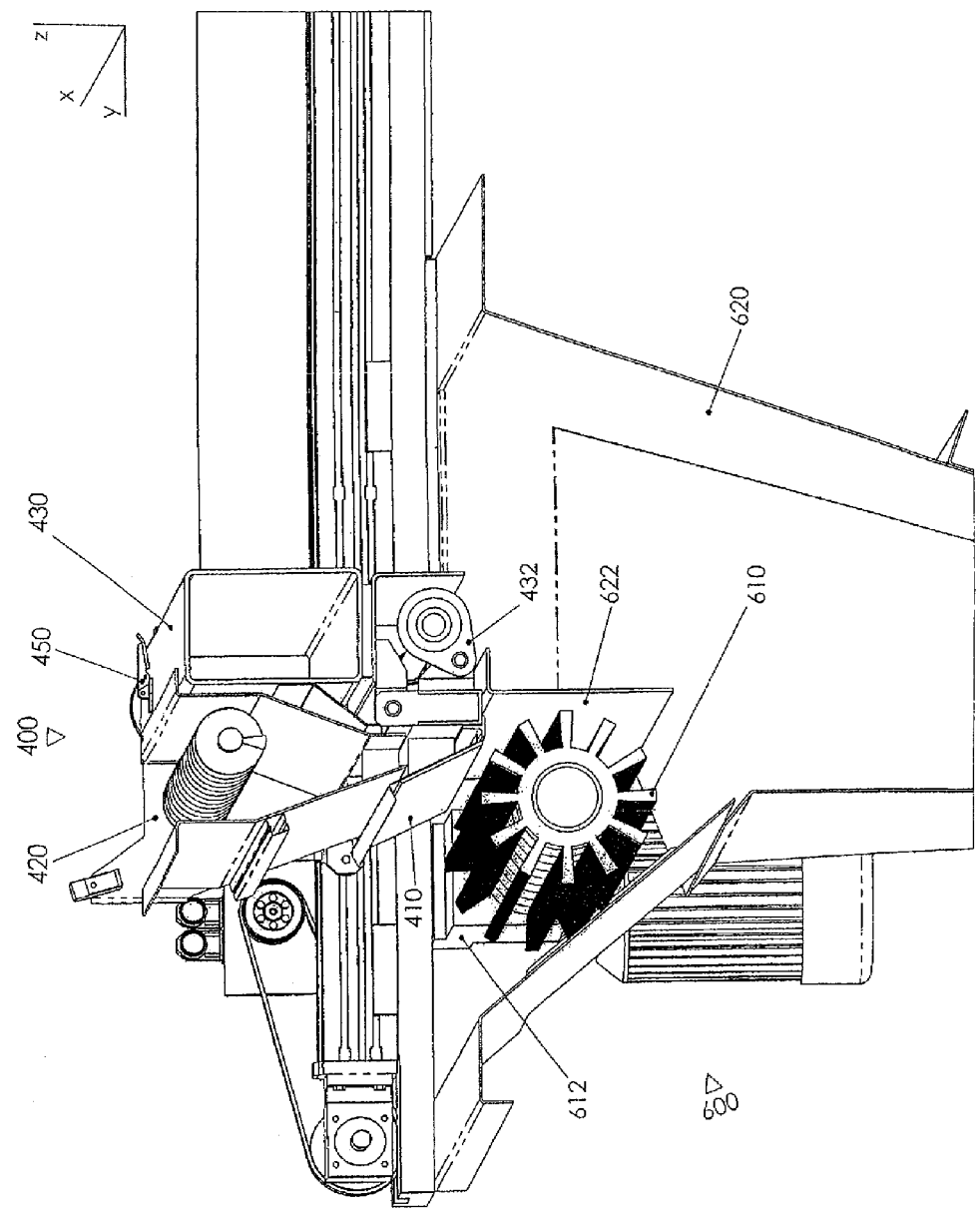
Figure 22:
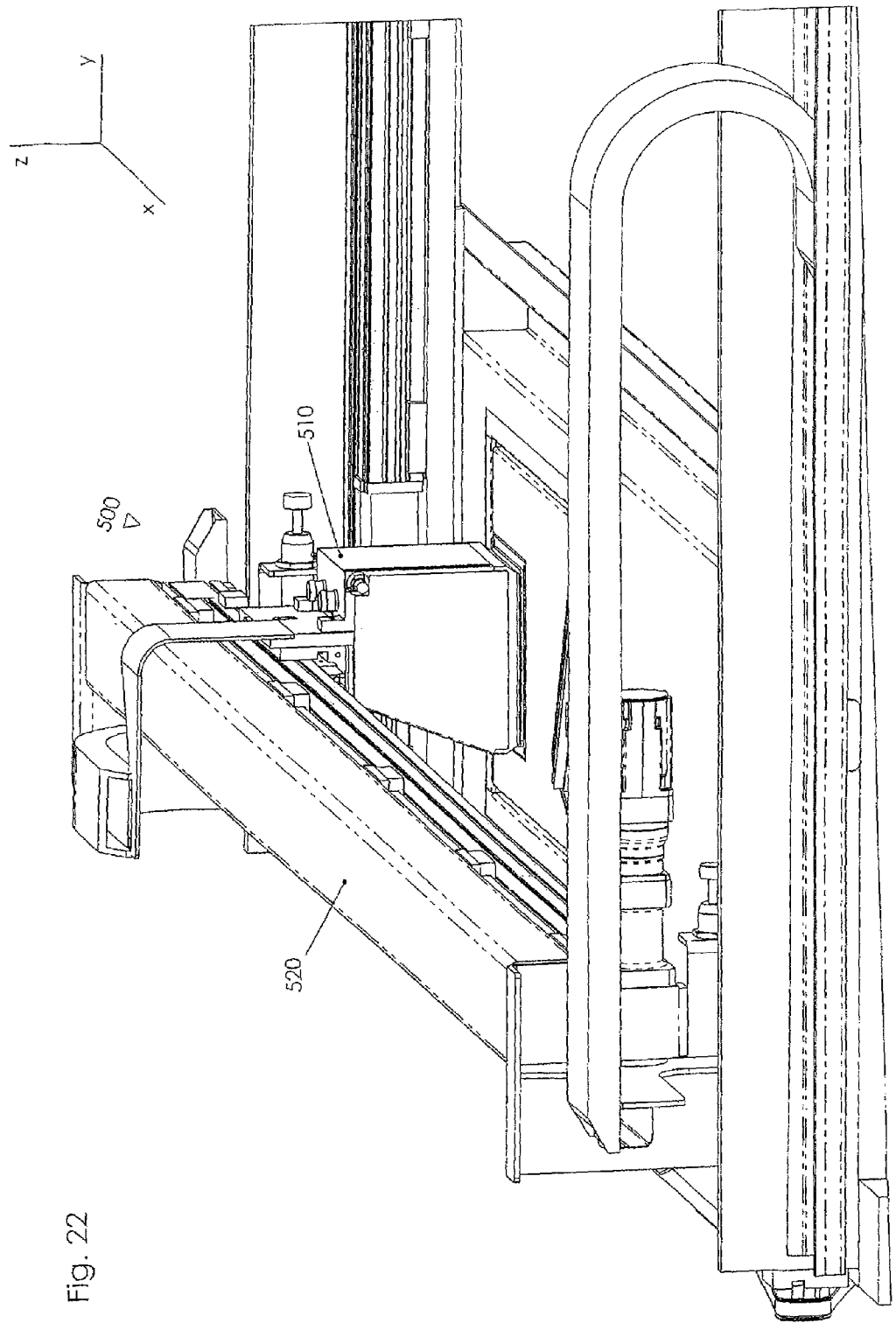
Figure 25:
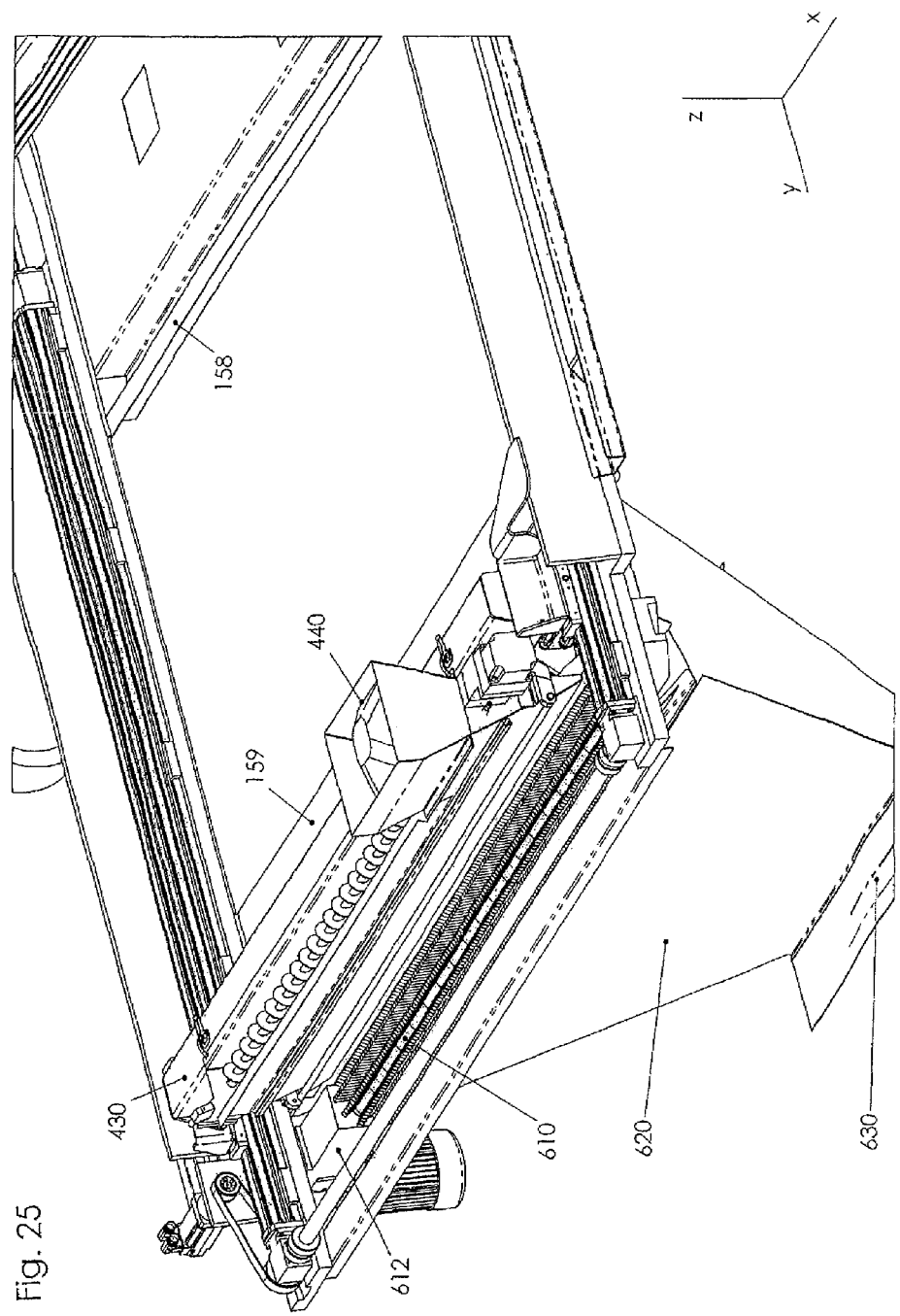
Figure 26:
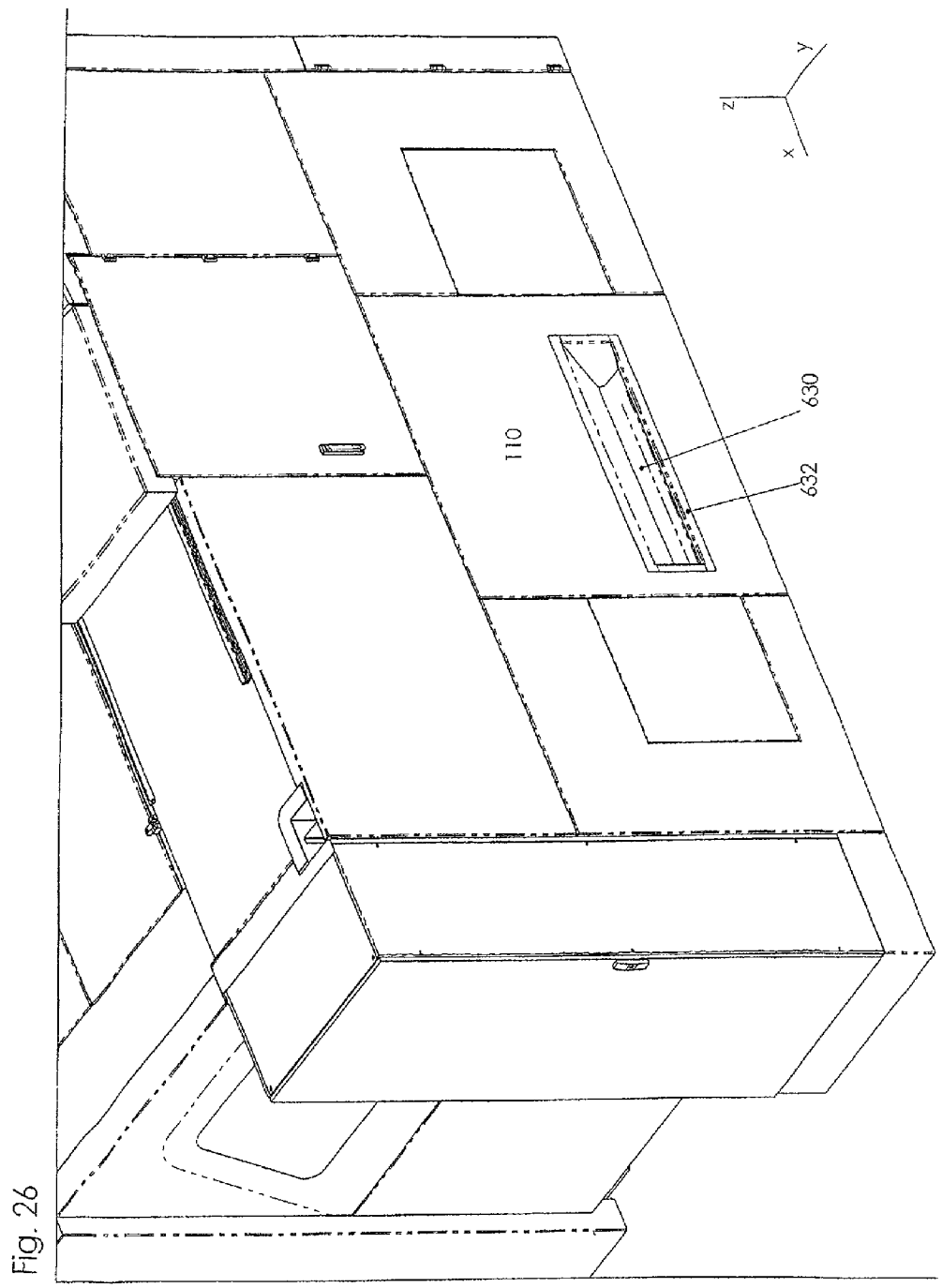
Figure 27:
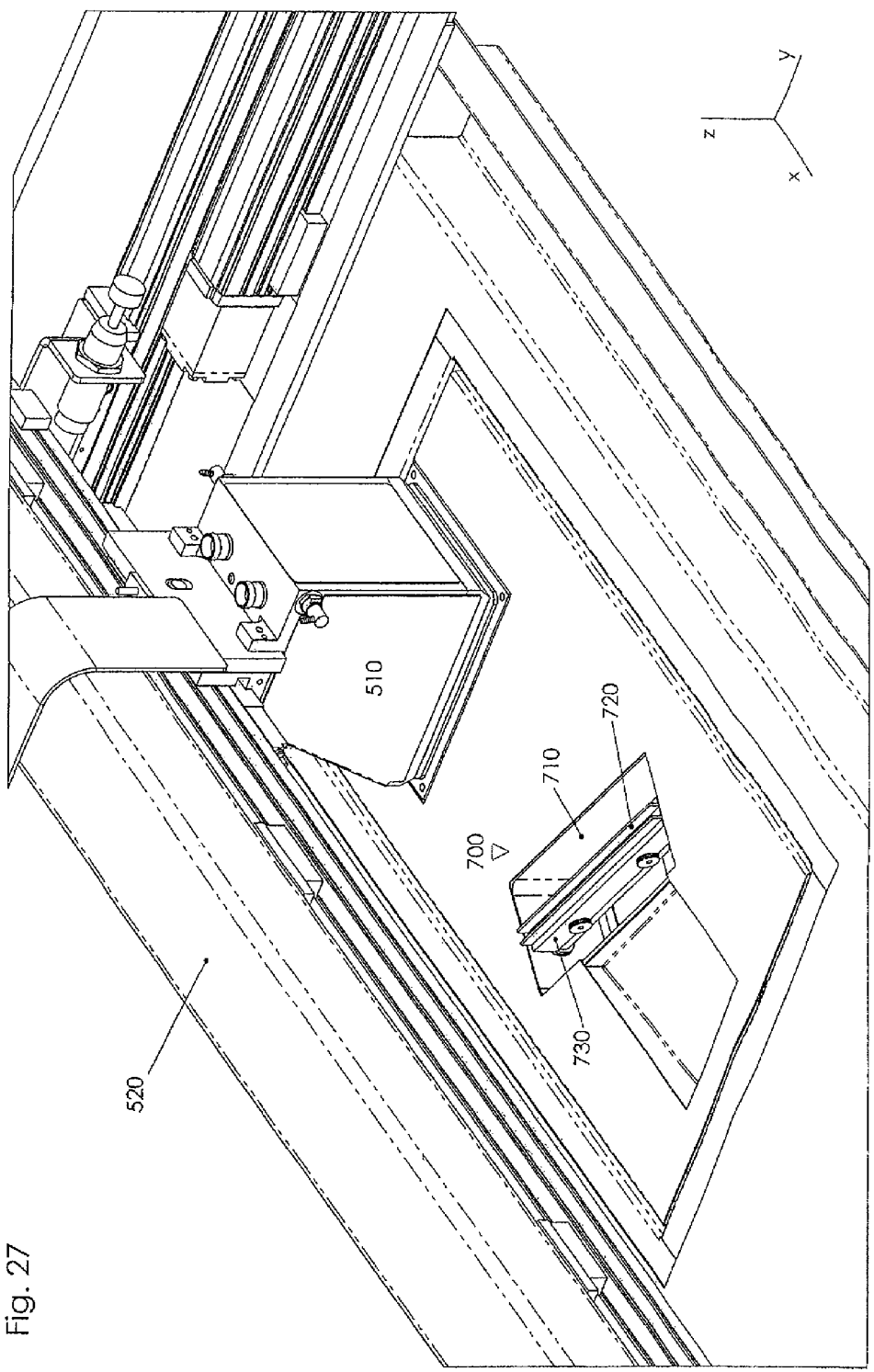
Figure 28:
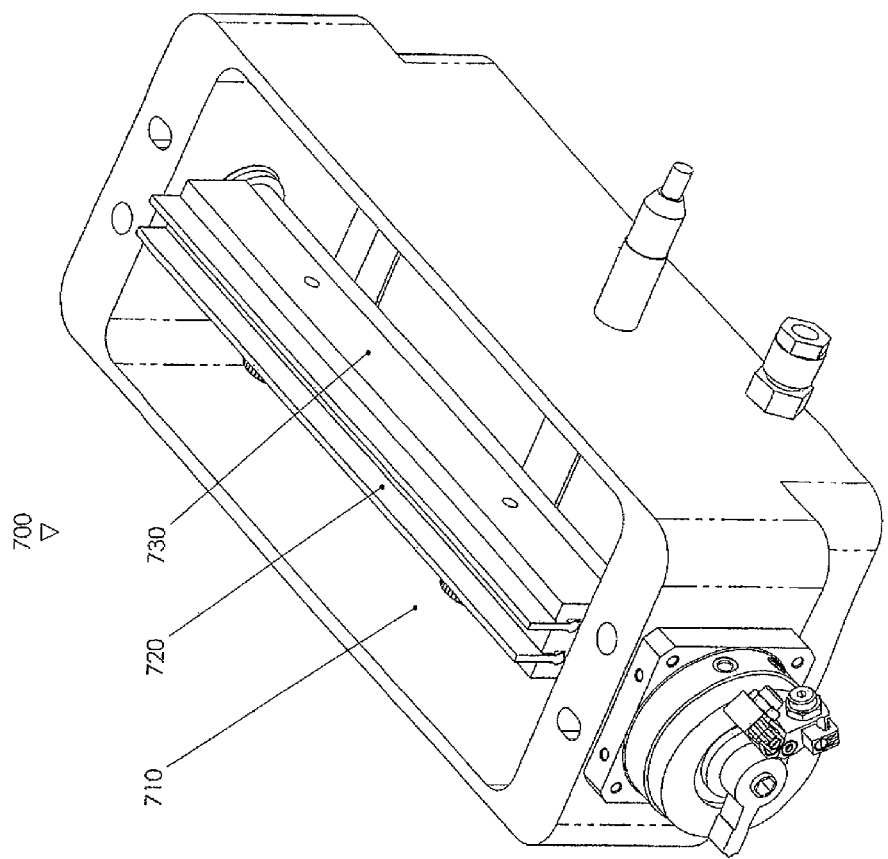
Figure 29:
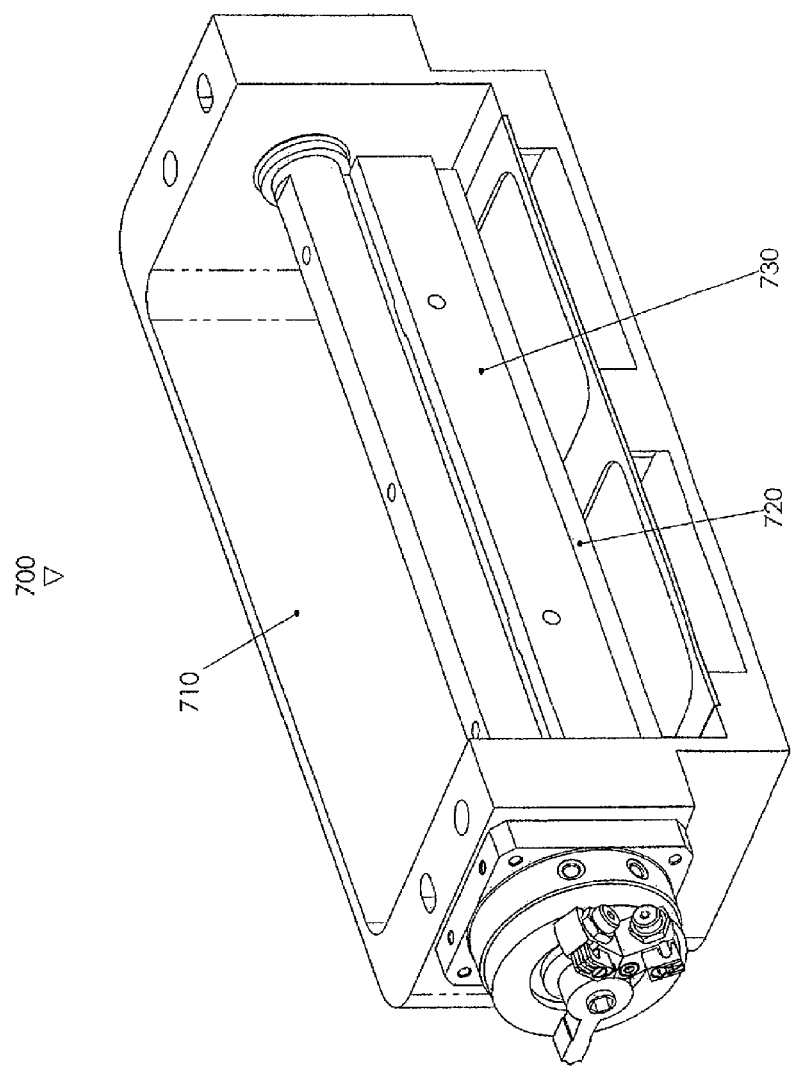

The invention will hereinafter be described in more detail by way of different embodiments and with reference to the drawings, in which:

FIG. 1 shows a perspective view of the front face of a plant or installation 100 according to the invention for the layered construction of a molded or shaped body according to a first embodiment of the invention, FIG. 2 shows a second perspective view of the installation according to the invention of FIG. 1, FIG. 3 shows a third perspective view of the installation of FIG. 1, the housing of the installation having been omitted, FIG. 4 shows a fourth perspective view of the installation of FIG. 1, the housing of the installation having been omitted, FIG. 5 shows a fifth perspective view of the installation of FIG. 1, the housing of the installation having been omitted, FIG. 6 shows a perspective view of a plant or installation according to the invention for the layered construction of a molded body or shaped body according to a second embodiment of the invention, FIG. 7 shows a perspective view of the front face and an adjacent side wall of a construction box 200 according to the invention, FIG. 8 shows the view according to FIG. 7, the encasement wall on the front face having been omitted, in order to show the travel drive and the lift drive of the construction box, FIG. 9 shows a perspective view of the front face of the construction box of FIG. 7 and FIG. 8, the construction box being arranged on the rail system of the installation and the construction box being moved into the unpacking position, FIG. 9A and FIG. 9B show further views of the construction box and of the rail system, FIG. 10 shows a perspective view of the front face and another side wall of the construction box which is turned away from the side wall shown in FIG. 7, FIG. 11 shows a perspective view of the installation frame and of the components of the construction box fixing system attached thereto, FIG. 12 shows a front view of the front face of the construction box, the construction box being located in the construction position and fixed to the installation frame, FIG. 13 shows a perspective view of the upper side of the construction box or rather the construction platform received therein, the construction box being located in the construction position, FIG. 14 shows a detailed view of the installation-fixed construction field cover which extends along a side wall of the construction box, thereby forming a labyrinth seal, FIG. 15 shows a detailed view of the labyrinth seal formed between the installation-fixed construction field cover and the construction box, FIG. 16 and FIG. 17 each show a perspective view of a mixing device 300 according to the invention, FIG. 18 shows a perspective view of the front face of a coating device 400 according to the invention, the coating device being in its operating position, i.e. the metering shaft and the charging container of the coating device each being fixed to the coating device carrier, FIG. 19 shows a perspective front view of the coating device of FIG. 18, the charging container of the coating device being pivoted away from the coating device carrier into a cleaning position, in order to clean, for example, the distributing worm of the charging container, FIG. 20 shows a perspective rear view of the coating device of FIG. 18, the charging container of the coating device being pivoted into a cleaning position together with the feed hopper, in order to clean, for example, the feed opening of the metering shaft, FIG. 21 shows a perspective view of the coating device of FIG. 18, the coating device being installed in the installation and being located in its operating position, and the front wall of the individual coating device components being omitted, FIG. 22 shows a perspective view of a printing device 500 according to the invention, comprising a print head carrier and a print head suspended therefrom, FIG. 23 shows a detailed view of the print head of FIG. 22 and suspension thereof from the print head carrier, FIG. 23a shows a schematic bottom view of the print head, to illustrate the arrangement of the print head nozzles, FIG. 24 shows a perspective view of a coating device cleaner 600 according to the invention, FIG. 25 shows a perspective view of the coating device cleaner of FIG. 24 and of the coating device, FIG. 26 shows a perspective view of a side wall of the installation housing, FIG. 27 shows a perspective view of the horizontally displaceable print head in its idle or parking position and of a print head cleaner 700 according to the invention arranged adjacent to the print head, comprising two wiper lips arranged laterally next to each other according to the embodiment shown, FIG. 28 shows a perspective view of the print head cleaner of FIG. 27, the two wiper lips being located in the print head cleaning position, FIG. 29 shows a perspective view of the print head cleaner of FIG. 27, the two wiper lips being located in the wiper lip regeneration position, and FIG. 30a to FIG. 30f show different embodiments of the print head cleaner according to the invention.

PLANT OR INSTALLATION 100

FIG. 1 to FIG. 5 show a rapid prototyping plant or installation 100 according to a first embodiment of the invention, which is equipped with a printing device for selectively solidifying the construction material layers. It should be noted that most of the components of the installation 100 are applicable to other rapid prototyping installations as well. For example, the construction box 200, the mixing device 300, the coating device 400 and the coating device cleaner 600 may also be used in a plant or installation for laser sintering without any problems, where necessary with slight modifications. In other words, the installation 100 may, for example, be converted to a laser sintering plant or installation by replacing the print head 500 with a radiation source, for example a laser.

A molded body, for example a mold, can be produced by means of the installation 100 directly from CAD data generated before, by forming construction material layers lying one upon the other and by selectively solidifying partial areas of the respective construction material layer before forming the next layer.

The molded body and the construction material layers, respectively, are constructed on a construction platform 210 of a construction box 200. The construction platform 210 is height-adjustable and can be lowered by one layer thickness prior to the application of a new construction material layer, so that the working plane (=the uppermost construction material layer) is always located on the same level.

The construction material comprises particulate material. For example, sand may be used as particulate material, especially sand as it is typically used in founding. The respective construction material layer is applied by means of a coating device 400 which is displaceable horizontally across the construction platform 210. The coating device 400 is fed with construction material through a mixing device 300.

A printing device 500 having a horizontally displaceable print head 510 is used for selectively solidifying the respective construction material layer, by means of which an appropriate binding agent can be applied/printed onto the layer to be solidified, for which purpose the print head 510 is moved in a meandering pattern across the construction material layer. The particulate material "glues together" or rather solidifies the particulate material selectively. For example, a resin may be used as a binding agent, such as furan resin. In addition, it is possible to use a multi-component binding agent, a first binding agent component (for example, the resin) being printed on through the print head 510, and a second binding agent component (for example, an activator or a hardener) being mixed with the particulate material. The resin selectively printed on by the printer reacts with the hardener present in the uppermost sand layer, thereby solidifying the resin and thereby binding/gluing together individual grains of sand. In addition, the portion of the uppermost layer to be solidified is bound to the portion to be solidified of the layer located directly below the uppermost layer by the solidifying resin.

In simplified terms, a shaped body can thus be formed, for example, as follows:

1. providing a construction material mixture, comprising molding sand and a hardener, using the mixing device 300,
2. applying the construction material to the construction platform 210 of the construction container 200 by means of the coating device 400 in a batchwise/layered manner,
3. feeding resin into the uppermost construction material layer using the printing device 500,
4. and repeating the steps 2 and 3 until the molded or shaped body is completed.

The coating device 400 and the printing device 500 are received in a housing 110 in which the above-described construction process takes place. The housing 110 comprises windows 120a to 120d for observing the process cycle. In addition, the housing 110 comprises a frontal construction box move-in/move-out opening 130, through which the construction box 200 can be moved into and out of the housing 110. As illustrated by FIG. 1, the construction box move-in/move-out opening 130 is closed by a rear end wall/cover wall 223 of the construction box 200, if the construction box 200 is fixed in the construction position. In other words, the construction box 200 forms part of the installation encasement in the construction position, so that no additional door or protection device is required.

Upon completion of the molded or shaped body, the construction box 200 is moved out of the housing 110 into the unpacking position shown in FIG. 2 by broken lines. This means that the construction box 200 is displaceable in the direction of arrow 201 between a construction position and an unpacking position (see FIG. 2). In the unpacking position, the complete molded or shaped body can be unpacked and exposed, for example by lifting or moving upwards the construction platform 210 and by blowing away or drawing off the loose, unsolidified mold sand. The process of lifting or lowering the construction platform 210 in the unpacking position may take place automatically or may be controlled manually by means of a press button 212 (see FIG. 7). Then, the molded or shaped body is removed, for example manually, and undergoes a final cleaning process, if necessary, for example a brushing process. Then, the construction box 200 is free and can be moved into the housing 110 or into its construction position again, so that the next construction job may be carried out.

Thus, the construction box 200 is continuously moved between the construction position and the unpacking position, for which purpose the construction box 200 is arranged on a rail system 140 (so-called simple shuttle operation). This means that the installation 100 shown in FIGS. 1 to 5 comprises exactly one construction box 200. Hence, the construction box 200 is not formed as an interchangeable container but rather in an installation-fixed manner; for example, the construction box 200 is configured to be self-propelled, for which purpose it comprises a construction box side travel drive 250 attached to the construction box, having its own propulsion motor 252 (see FIG. 8 and the following description of the construction box) which is supplied with electric current through a drag chain or drag line 270 (see FIGS. 2 and 3); in addition, the construction box 200 has a construction box side lift drive 260 having its own hoist motor 262 which is also supplied with electric current through the drag chain 270 (in this respect, see FIG. 8 as well as the following description of the construction box).

As shown by FIG. 6, the installation 100 may, according to another embodiment of the invention, also comprise a second construction box 200' which is movable between the common construction position and a second unpacking position along the arrow 201 along a second rail system 140 (or a common rail system) and through a second frontal construction box move-in/move-out opening in the housing 110, which is turned away from the first construction box move-in/move-out opening. Consequently, upon completion of a first molded body using the first construction box 200, the first construction box 200 may be moved into the first unpacking position associated therewith, so as to unpack the molded body. As soon as the installation 100 is free, i.e. as soon as the first construction box 200 has been moved out of the installation, the second construction box 200' can be moved and fixed in the construction position, so as to produce a second molded body using the second construction box 200' (so-called double shuttle operation). Due to the double shuttle operation, the installation 100 can be operated in a virtually continuous manner, whereas only a batch operation is possible with the simple shuttle system. The construction box 200' is installation-fixed like the construction box 200, and is also configured to be self-propulsive. For the rest, the installation 100 shown in FIG. 6 corresponds to the installation 100 shown in FIGS. 1 to 5.

FIG. 3 to FIG. 5 show the installation 100 without the housing 110. The construction box 200 is located in the construction position, and the construction platform 210 is displaced upwards. The print head 510 of the printing device 500 and the coating device 400 are each in their parking position. The coating device 400 and the printing device 500 are arranged on opposed sides of the construction platform 210 in the respective parking position, for example, the print head carrier 520 and the coating device carrier 430 are arranged to be parallel to each other and parallel to the longitudinal sides of the construction platform 210. Both carriers 430 and 520 are displaceable across the construction platform 210 in a y-direction, i.e. in a transverse direction of the construction platform 210 and perpendicular to the moving direction of the construction box 200. In addition, the print head 510 can be moved in an x-direction, i.e. in a longitudinal direction of the construction platform 210 along the print head carrier 520. However, in an alternative embodiment, the print head carrier 520 and the coating device carrier 430 may also be arranged perpendicularly to the longitudinal axis of the construction platform 210, i.e. on the short opposing sides of the construction platform 210, so that they are movable in an x-direction across the construction platform 210. The mixing device 300 is fixed to a vertical column 151 of the installation frame 150, namely above the charging container 410 and above the feed hopper 440 of the coating device 400, the output opening 312 of the mixing device 310 being arranged above the feed hopper 440 in the feeding position of the coating device 400, so as to supply the charging container 410 with freshly prepared construction material through the feed hopper 440.

The installation 100 further comprises a central controller which is not shown, by means of which the process flow and the individual components, such as the mixing device 300, the coating device 400, the printing device 500, the coating device cleaning station 600 and the print head cleaning station 700 can be controlled. As defined by the present application, the term "control" shall also enclose the term "regulate", i.e. the controller may also be a regulation device.

CONSTRUCTION BOX 200

Hereinafter and with reference to FIGS. 7 to 15, the construction box 200 (which is alternatively also referred to as a construction container 200) and the rail system 140 provided for the construction box 200 (especially FIGS. 7 to 9), the construction box fixing system for adjusting and fixing the construction box 200 to the installation frame 150 (FIGS. 10 to 12) and the construction field cover (FIGS. 13 to 15) will be described in detail.

As shown in FIG. 7, the construction box has four construction box walls/lateral walls 221, 223, 224, and 226 which extend in a vertical direction each. The front side wall/end wall 221 serves as an encasement wall and forms, together with a vertical front wall 220 of the construction box, a space for receiving the travel drive 250 and the lift drive 260 (see FIG. 8). Likewise, the rear side wall/end wall 223 serves as an encasement wall and forms, together with a vertical rear wall (not shown) of the construction box, a second space for receiving another lift drive (not shown). The two lateral walls 224 and 226 form, together with the front wall 220 and rear wall, a container or boundary frame which is open at the top and at the bottom and which is configured to be rectangular in cross-section, i.e. the boundary frame has two short lateral walls and two long lateral walls.

In addition, the construction box 200 comprises a first construction field plate/cover plate 232 and a second construction field plate/cover plate 230 which extend each in a horizontal direction between and perpendicularly to the two long lateral walls 224 and 226 and cover the first and second space, respectively, in an upward direction. If the construction box 200 is located in the construction position, the two plates 230, 232 form a part of the construction field cover (see, for example, FIG. 13).

In addition, the construction box 200 comprises a construction platform 210 which forms a container bottom height-adjustable in the vertical direction, for which purpose the construction platform lower side is supported on a construction platform carrier (not shown), for example a bracket which is displaceable in a vertical direction by a lift drive. The construction platform upper side forms the working surface on which the object to be produced is constructed. During the construction process, i.e. when the construction box 200 is located in the construction position, the movement of the construction platform is controlled by the central controller. In addition, the position of the construction platform 210 can be adjusted manually by a press button 212 attached to the front wall 220.

A plurality of lateral guide rolls 240 are attached to the lower side of the construction box 200 (four according to this embodiment), which cooperate with the rail system 140, in order to allow for a centering/alignment of the construction box 200 in/along the y-direction, i.e. in a construction box transverse direction. The guide rolls 240 may, for example, roll off the inner sides or the outer sides of the rails 141, 142. In addition, a ledge-shaped slide or roll skid 242 is respectively attached to the lower side or rather the lower front surface/edge surface of the first side wall 224 and to the lower side of the second side wall 226, wherein the two skids 242 may stand on rolls 144 attached to the inner sides or the outer sides of the rails 141, 142, which are shown in broken lines in FIG. 7. In addition, a gearwheel 254 is attached to the construction box lower side, which is part of the construction side travel drive 250 shown in FIG. 8 and which is engaged with the rack 143 of the rail system 140 shown in FIG. 9. In case of a rotational movement of the gearwheel 254, the construction box 200 is therefore moved in the x-direction cross the rolls 144.

FIG. 8 shows the construction box 200 without the front end wall 221. As shown by FIG. 8, the construction box 200 comprises a construction box travel drive 250 integrated in the construction box and a construction platform lift drive 260 integrated in the construction box 200. In the embodiment shown, the construction box travel drive 250 and the construction platform lift drive 260 are attached to the front face of the construction box 200 (between the front end wall 221 and the front wall 221 arranged in parallel thereto). This has the advantage that the drag chain/drag line 270 for the electric connections (cf. FIGS. 2 and 3) may be configured to be shorter and is easier to guide, as the front face 220 faces the housing 110 of the installation in the unpacking position of the construction box. The two drive mechanisms 250, 260 may, however, also be positioned at another location, for example on the rear face each. Alternatively, the two drive mechanisms 250, 260 may also be distributed to the front and rear faces. According to another embodiment of the invention, a travel drive 250 and a lift drive 260 are provided on the front face, as shown in FIG. 8, an additional lift drive (not shown) synchronized with the lift drive 260 being provided on the rear face. According to another embodiment, an additional travel drive may additionally be provided on the rear face.

By means of the construction box travel drive 250, the construction box 200 can be moved back and forth between the construction position and the unpacking position in the above-mentioned simple shuttle operation (in the direction of the x-axis, i.e. in a longitudinal direction of the construction box). Due to the integrated travel drive 250, a separate device for moving the construction box 200 into and out of the housing 110 can be omitted. In addition, the construction height can be reduced. The construction box travel drive 250 comprises a travel drive motor 252 which forms part of the construction box 200. Power supply of the travel drive motor 252 is obtained by a drag chain 270 (cf. FIGS. 2 and 3). The motor 252 drives the gearwheel 254 already described above, which is engaged with the rack 143. The travel drive 250 is connected to the central controller (also through the drag chain 270), so that the construction box 200 can be displaced in an automated manner.

The construction platform lift drive 260 comprises a lift drive motor 262 which forms part of the construction box 200. The construction platform lift drive 260 further comprises a screw spindle 264 arranged rotatably and a spindle nut (not shown) which is movable upwards or downwards along the spindle by rotating the spindle 264. In this respect, the spindle nut is connected to the carrier (not shown) that supports the construction platform 200 at its lower side. For this purpose, a recess is provided in the front wall 221, through which the bracket is gripping, in order to support the construction platform 210 from below. Thus, the construction platform 210 can be lowered or lifted by rotation of the spindle. Such a spindle drive mechanism is, for example, described in DE 20 2006 010 327 U1 to which reference is made insofar as the spindle drive, comprising the motor, the spindle, the spindle nut and the bracket is concerned. However, other than the construction container described in DE 20 2006 010 327 U1, the construction box 200 is not provided as an interchangeable container but rather as an inherent part of the installation. Sealing of the recess in the front wall 221, through which the carrier grips, can, for example, be obtained by a metal sheet acting like a roller blind and laying alongside the inner side of the front wall 221, in order to cover/seal the bracket recess when the construction platform 210 is lowered. Such a sealing is, for example, described in DE 100 47 615 (cf. therein FIGS. 2 and 3), to which reference is made in this respect. Power supply of the motor 262 is obtained just like the power supply of the motor 252 through the drag chain 270 (cf. FIGS. 2 and 3). In addition, the construction platform lift drive 260 is also connected to the central controller (also through the drag chain 270), so that lowering the construction platform 210 during the construction process can be controlled by the controller. Lifting the construction platform 210 in the unpacking position of the construction box 200 can also be effected either by the central controller or can be controlled manually by operating the press button 212. The lift drive 260 integrated in the construction box 200 can therefore be used both during the construction process and during the unpacking process of the finished molded body, so that a separate motor for unpacking can be dispensed with. In addition, the construction platform does not have to be lowered to the bottom dead center upon completion of a construction job and prior to its displacement out of the housing into the unpacking position, as it is the case with installations where the lift drive is mounted on the installation frame, but can be moved by the construction box side travel drive 250 to the unpacking position directly upon completion of the molded body, in which the construction platform 210 is lifted by the construction box side lift drive 260. Hence, also time can be saved by arranging the lift drive 260 and the travel drive 250 on the construction box 200.

FIG. 9 shows the construction box 200 on the rail system 140 provided for the construction box 200.

As also shown by FIG. 9A and FIG. 9B, the construction box has its own construction box travel drive 250 which in this case is received in the space formed between the front encasement wall 221 and the front wall 220 which is not shown in these Figures. However, the travel drive 250 may also be arranged at another location, for example in the opposite space formed at the rear side of the construction box 200. The construction platform lift drive 260 is not shown in FIG. 9A and FIG. 9B, but may, for example, be arranged in the front space together with the construction box travel drive 250.

The travel drive 250 is coupled to a gearwheel 254 which in this case is arranged horizontally and attached to the construction box lower side, and which can be driven by a construction box travel motor 252 (for example, an electric motor) of the travel drive 250, which is integrated into the construction box 200. The gearwheel 254 fixed to the lower side of the construction box 200 cooperates with a rack 143 (here a bar, the interior or inner lateral surface of which is formed as a toothed surface or a as teeth), for which purpose the gearwheel 254 is engaged with the rack 143 and rolls off the same when being driven (the gearwheel/gear pinion) by the travel motor 252, so that the construction box 200 is movable along the rack 143.

In addition, the construction box 200 has several lateral guide rolls 240, in this case altogether four, which may, for example, be attached to the lower side of the construction box 200 (for example, in a construction box longitudinal direction in front of and behind the skids 242 described below). The four guide rolls 240 have, for example, a vertical roll axis each. The guide rolls 240 cooperate with two guide rails (right guide rail 141 and left guide rail 142), at the outer lateral surfaces of which they can roll off (see FIG. 9A and FIG. 9B).

Moreover, the construction box 200 has on its lower side two construction box rails or ledges or skids 242 extending in a construction box longitudinal direction, with which the construction box 200 may roll on support rolls 144 (see FIG. 9B). The support rolls 144 are attached to the outer lateral surfaces of the guide rails 141, 142 in this case (below the roll-off surface for the guide rolls 240), whereby so-called roll-off rails 141, 142 are formed. This means that the support rolls 144 are fixed to the guide bars/guide rails 141, 142 from outside, in order to support the construction box 200 on or rather through the rails/skids 242.

The above-described rack 143 may, for example, be attached to or formed on the interior lateral surface of one of the guide rails 141, 142. In FIG. 9A and in FIG. 9B, the rack 143 is formed on the interior lateral surface of the left guide rail 142 with teeth oriented inwards. The gear pinion 254 driven by the travel motor 252 is engaged with the toothed surface of the rack 143 from inside.

The two guide rails 141, 142 which together with the support rolls 144 also form the two roll-off rails, and the rack 143, together form a rail system 140 within the meaning of the present invention. The guide rails 141, 142 may be provided with cover plates 149.

Alternatively, the rail system 140 may, for example, comprise a first rail 141 and a second rail 142 which are arranged in parallel. In addition, the rail system 140 may comprise a rack 143 that is, for example, arranged parallel and close to the second rail 142. The teeth of the rack 143 may face the first rail 141. The gearwheel 254 attached to the construction box lower side is engaged with the teeth of the rack 143, so as to roll off the rack 143, when the gearwheel is driven by the motor 252. The two guide rolls 240 which are arranged on the side of the second side wall 226 roll off the side of the rack 143 facing the second rail 142 (cf. FIG. 12). In addition or alternatively, the two guide rolls 240 may also roll off the inner side of the second rail 142. The two guide rolls 240 which are attached to the side of the first side wall 226 roll off the inner side of the first rail 141.

Hence, the construction box is centered by the guide rolls 240 along/in the y-direction. In order to reduce friction occurring when displacing the construction box 200, rolls 144, by means of which the construction box 200 can roll with the skids 242, are attached to the inner surfaces of the rails 141, 142 facing each other or to the outer surfaces of the rails 141, 142.

It is important for the construction process that the construction box 200 is located exactly in the predetermined construction position, for which purpose the construction box 200 should be centered and fixed in all axial directions. Such centering and fixing in a y-direction is effected by the above-described guide roll system. In a z-direction, the construction box is fixed sufficiently by its own weight. Hence, only a centering and fixing in an x-direction is necessary after moving the construction box 200 into the housing 110 and into the construction position, which is performed by the construction box fixing system shown in FIGS. 10 to 13.

As shown in FIG. 10, the construction box 200 comprises a stopper plate 226a, an alignment recess 226b and a sensor target 226c on one of the two lateral walls (according to this embodiment on the second side wall 226). The stopper plate 226a is arranged at the back in a longitudinal direction, i.e. near the rear end wall 223, and the recess 226b is arranged at the front (near the front end wall 221). The position of the stopper plate 226a and the position of the recess 226b may, however, also be exchanged. In a z-direction, the stopper plate 226a and the recess 226b are arranged in the lower region of the side wall. The alignment recess 226b is cone-shaped. The sensor target 226c is substantially centered in the longitudinal direction.

As shown in FIG. 11, a first pressing member/alignment member 152 which cooperates with the alignment recess 226b, a second pressing member/fixing member 154 which cooperates with the stopper plate 226a, and a sensor 156 which cooperates with the sensor target 226c are attached to the installation frame 150. The first pressing member 152 and the second pressing member 154 are each movable/displaceable in a y-direction. The movement of both pressing members 152 and 154 is controlled by the central controller. The first pressing member 152 comprises a mandrel that is shaped in accordance with the shape of the tapered recess 226b. For example, the end portion of the first pressing member 152 is cone-shaped. The second pressing member 154 comprises a bolt having a flat end portion.

When the construction box 220 is moved into the housing 110, the sensor 156 detects whether the sensor target 226c is in a predetermined position. If the sensor target 226c is in the predetermined position, the sensor emits a "construction box in position signal" to the central controller. Then, the central controller causes the two pressing members 152, 154 to come out, i.e. their movement in a y-direction towards the construction box 200. Thereby, the first pressing member 152 is pressed in the recess 226e (see FIG. 12) with the cone, and the second pressing member 154 is pressed against the stopper plate 226a with the flat end portion, whereby a centering and fixing of the construction box 200 is caused in/along the x-direction and on the installation frame. Then, the construction process may start.

Due to the fact that the centering in the y-direction is already effected by the guide rolls 240, it is sufficient to configure the construction box fixing system on one side, i.e. it is sufficient if only one of the two lateral walls is provided with the recess 226b and the stopper plate 226a.

In FIG. 13, the construction box 200 is fixed in its construction position. As shown by FIG. 13, the construction field cover and the construction field frame, respectively, enclosing the construction platform 210 and the construction field, respectively, is formed, on the one hand, by the two horizontal cover plates 230 and 232 attached to the construction box 200, and, on the other hand, by two installation side horizontal boundary plates 158 and 159 (also see FIGS. 24 and 25) which are attached to the installation frame 150. The two construction box side construction field plates 230 and 232 run parallel to the y-axis (=construction box transverse direction) with their respective longitudinal axis, and the two stationary installation frame side construction field plates 158 and 159 run parallel to the x-axis (=construction box longitudinal direction) with their respective longitudinal axis.

As shown by FIGS. 14 and 15, the first side wall 224 comprises a step 224d on its upper side and on its upper edge surface extending in a horizontal direction between the outer surface 224a and the inner surface 224b of the first side wall 224. The step 224d abuts against the inner surface 224b and is substantially arranged in the same horizontal plane as the two construction box side construction field plates 230, 232. In addition, a horizontal edge surface 224c is formed on and by the upper side of the upper edge surface, respectively, which is lowered relative to the step 224d and forms a sealing surface. The horizontal edge surface 224c abuts against the outer surface 224a. The amount and the height, respectively, by which the sealing surface 224c is lowered relative to the horizontal surface of the step 224d and relative to the two construction box side construction field plates 230, 232, is somewhat greater than the thickness of the frame side construction field plate/boundary plate 158, so that there is sufficient vertical tolerance between the lower side of the frame side construction field plate 158 and the sealing surface 224c, so that the construction box 200 can reliably be moved into the construction position. The gaps formed between the sealing surface 224c and the frame side construction field plate 158 can, for example, have a gap height of 3 to 20 mm, for example a gap height of 3 mm to 10 mm. In addition, the sealing surface 224c has such a width that there is, on the one hand, sufficient horizontal tolerance between the frame side construction field plate 158 and the step 224d, so as to displace the construction box 200 into and out of the construction position, and so that, on the other hand, sufficient construction material run length is provided. The construction material run length is the length by which the sealing surface 224d is exceeded by the frame side construction field plate 158 (see FIG. 15), i.e. the construction material run length corresponds to the length of the gap that is formed between the sealing surface 224e and the frame side construction field plate 158. The construction material run length is chosen so as to disrupt the construction material in the gap s (see FIG. 15). In other words, a conical pile is formed in the gap s by the construction material, the length of the conical pile being shorter than the construction material run length. The sealing between the construction box 200 and the frame side construction field plate 158 formed in such a manner is referred to as conical pile sealing or, alternatively, as labyrinth sealing.

The second side wall 226 is provided with a step in the same manner, in order to form a conical pile sealing between the construction box 200 and the frame side construction field plate 159.

Hence, the construction box 200 can be moved along the x-direction into the construction position by the integrated travel drive 250 and can be fixed in the construction position by means of the above-described construction box fixing system; in this respect, the construction job may be started directly after fixing the construction box 200. Further steps, such as lifting the construction box 200, are not necessary. In addition, the installation height can be kept low, as the construction field height substantially corresponds to the construction box height.

MIXING DEVICE 300

Hereinafter, a mixing device 300 according to the invention will be described in detail with reference to FIGS. 16 and 17.

It should be noted that the mixing device 300 and the above-described construction box 200 are not limited to the use of the "printing installation" described herein, but rather can be used in other rapid prototyping installations/methods as well, such as in laser sintering.

The mixing device or mixing unit 300 comprises a mixer 310 by means of which a homogenous construction material mixture can be generated. The mixer is arranged above the coating device 400 and is integrated in the installation 100.

Here, the mixer 310 is formed as a cylindrical container that delimits a mixing chamber in which an agitation or mixing member is arranged which can be driven by a mixing drive that is connected to the central controller. The mixing chamber has a funnel-shaped output opening 312 which in the feeding position of the coating device 400 (see FIG. 16) is arranged above the coating device 400, so that the construction material freshly prepared in the mixer 310 can be supplied to the coating device 400 through the output opening 312. The mixer is fixed to a vertical column 151 of the installation frame 150. The output opening 312 of the mixer 310 is closed by an adjustable valve that is driven by the central controller.

The mixing unit 300 further comprises a first dosage container 320 arranged above the mixer 310, in which fresh mold sand is received, and a second dosage container 330 arranged above the mixer 310, in which recycled mold sand is received. The first dosage container 320 and the second dosage container 330 each stand on three weighing cells 322, 332 measuring the associated dosage container's 320, 330 weight and each being connected to the central controller. Both dosage containers 320, 330 are connected to the mixer 310 by a pipeline. An adjustable valve (for example, a flap or a valve) is provided in the respective pipeline, which is driven by the central controller. The first dosage container 320 and the second dosage container 330 each can be filled with mold sand by a suction pipe not shown which can be fixed to the connection port 326, 336, for which purpose they each comprise a device 324, 334 for generating negative pressure.

In addition, the mixing unit 300 may comprise a third dosage container (not shown) arranged above the mixer 310, in which a powdery additive is contained which is, for example, supplied to the mixer 310 through a cellular wheel sluice connected to the central controller, Moreover, a fluid (here: activator/hardener) can be supplied from a first liquid container 340 to the mixer 310 in a dosed and controlled manner by means of a dosing pump 344 through a fluid pipeline 342.

By means of the above-described mixing unit, the construction material can be prepared freshly and directly in the installation during the construction operation and can be supplied to the coating device over a short distance for example directly following its preparation. The individual components are fed in a pure form to the mixing unit arranged above the coating device in the feeding station of the installation (solids/powders, for example, through a suction line, fluids, for example, by pumps), where the construction material mixture is prepared and fed into the coating device upon completion, namely by opening the valve (for example a flap or a gate valve) that controls the output opening 312.

COATING DEVICE 400

FIGS. 18 to 21 show a horizontally displaceable coating device 400 for applying the construction material layer to the construction field. The coating device 400 comprises an elongate metering shaft 410 that is funnel-shaped in cross-section. The metering shaft 410 has a longitudinal slot 412 on its lower side for dispensing the construction material as the metering shaft 410 moves across the construction field. On its upper side, the metering shaft 410 comprises an upper feed opening 414 through which construction material can be fed to the metering shaft 410.

The coating device 400 further comprises a charging container 420 co-travelling with the metering shaft, which is arranged above the metering shaft 410 and comprises a lower output opening 422 that plunges in the feed opening 414 of the metering shaft 410, so as to supply the metering shaft 410 with construction material during the construction process.

The metering shaft 410 and the charging container 420 are mounted on a coating device carrier 430, the charging container 420 being pivotally connected to the coating device carrier 430, so that it can be pivoted away from the carrier 430 and the metering shaft 410. In normal operation, the coating device carrier 430 is fixed to/secured to the carrier 430, namely by means of a locking device 450 comprising a gripping arm 452 which in the locking state shown in FIG. 18 is engaged with an engagement opening 454 provided on the charging container 420, as shown in FIG. 18.

Due to the pivotal configuration of the charging container 420, accessibility of the metering shaft and the charging container for cleaning and/or repairing the same is improved. For cleaning and/or repairing the coating device 400, for example, first the construction box 200 can be moved out of the installation 100, so as to provide space in the center of the installation, whereupon the coating device 400 is moved to the center of the installation. Then, it is possible to enter the installation and, for example, to pivot the charging container 420 away from the metering shaft 410 and the carrier 430, so as to clean/repair individual locations/parts of the coating device 400, such as the feed opening 414 of the metering shaft 410, the output opening 422 of the charging container 420 or the interior walls of the charging container 420 and of the metering shaft 410. For example, the coating device 400 may be dimensioned to be large due to the pivotal configuration of the charging container 420; at the same time, it can still be cleaned and/or repaired by a single person without any problems, as no lifting device or the like is necessary to lift the charging container upwards and to move it away from the metering shaft.

A distributing worm 426 is arranged in the coating device 400, which is pivotal together with the charging container 420 and which distributes the construction material along the charging container longitudinal direction.

A feed hopper 440 is screwed to the top of the charging container 420, through which construction material can be introduced into the charging container 420 from the mixing device 300 arranged above the coating device 400.

The longitudinal slot 412 of the metering shaft 410 is partially covered by a particulate material deflector plate 416 which is arranged at a distance above the longitudinal slot 412 and parallel thereto.

PRINT HEAD 500

The printing device 500 shown in FIGS. 22 and 23 comprises an elongate horizontal print head carrier 520 that is displaceable along a first horizontal direction (=x-direction) across the construction field.

Moreover, the printing device 500 comprises a print head 510 suspended from the carrier 520, which is provided with a plurality of print head nozzles 514 for a controlled output of resin onto the construction material layer to be solidified. As illustrated by FIG. 23*a*, the print head 510 has a plurality of printing modules 512 arranged in series one after another in a print head carrier longitudinal direction (x-direction) and each comprising a plurality of print head nozzles 514 arranged in series one after another in a print head carrier transverse direction (y-direction). The printing modules 514 are arranged in two printing module lines, the modules 512 of one line being offset relative to the modules 512 of the other line.

The print head 510 is mounted on a guide block 530 which is guided on the carrier bottom side of the print head carrier 520 to be displaceable along the print head carrier longitudinal axis, so that the print head is displaceable in an x-direction and is displaceable in an altogether meandering pattern across the construction field. The print head 510 is arranged below the print head carrier 520, at least in part gripping under the carrier 520 (see FIG. 23). The center of mass of the print head 510 is located under the print head carrier 520, for example also under the guide block 530.

With the above-described printing device 500, a torque generated by the print head 510 can be reduced greatly about the printing axis print head carrier longitudinal axis, x-direction), thereby, on the one hand, minimizing torsion of the print head carrier 520 and hence significantly improving stability and a low vibration level of the print head 510, and, on the other hand, thereby minimizing alignment errors of the print head nozzles 514 and thus improving printing quality. At the same time, good parallelism and a defined distance of the print head lower side to the upper side of the layer to be printed on the construction field can be guaranteed. Thereby, the number of print head nozzles 514 and print head modules, respectively, and consequently the installation throughput can be increased significantly without adversely affecting the quality of the component part to be produced. In addition, an increase in stability and vibration resistance of the print head 510 can minimize the distance of the print head lower side to the upper side of the layer to be printed on. Moreover, moments of tilt acting on the guide block 530 and guidance thereof on the print head carrier 520 can be reduced, so that running smoothness of the guide block 530 is improved especially for small incremental movements which contributes to improving the printing quality. Furthermore, the installation can be constructed to be narrower, as the parking position of the print head carrier 520 in which the print head carrier 520 is parked between two successive printing operations can be advanced further to the construction field, compared to a conventional print head device where the print head is suspended laterally next to the print head carrier and therefore projects away therefrom in a horizontal direction.

COATING DEVICE CLEANER 600

FIGS. 24 to 26 show a coating device cleaner 600 for cleaning the metering shaft 410 of the above-described coating device 400. The coating device cleaner 600 comprises an elongated brush 610 that is received underneath the metering shaft 410 of the coating device 400 in a construction material collection container 620. The length of the brush 610 is at least equal to the length of the metering shaft 410. The brush 610 is supported rotatably and is driven rotatably by a wiper element drive 612 that is connected to the central controller. The central controller controls the entire cleaning process of the coating device 400, i.e. the displacement of the coating device 400 towards the cleaning device 600, the rotational movement of the brush 610, as soon as the coating device 400 is in the cleaning position, and the displacement of the coating device 400 back into its parking position once the cleaning is finished. The controller is able to initiate a cleaning of the coating device 400, for example following a predetermined number of coating displacements or depending on a sensor signal which indicates whether it is necessary to clean the metering shaft 410. A deflector plate 622 is arranged within the construction material collection container 620 in such a manner that construction material that is stripped off the metering shaft 410 by means of the brush 610 is deflected by the deflector plate 622 towards the lower side of the construction material collection container 620. The construction material collection container 620 leads in a storage funnel for excessive construction material, and the storage funnel leads to a storage outlet trough 630. The storage outlet trough 630 is connected to the output opening 632 through a slot, which is provided in an exterior wall of the installation housing 110 and through which the construction material collected in the reservoir can be removed, for example withdrawn by suction during the construction process.

PRINT HEAD CLEANER 700

The resin to be printed on by means of the print head 510 is strongly viscous and may adhere to the nozzle openings and to the print head lower side, respectively, under certain circumstances. Likewise, dispersed particulate material may adhere to the print head lower side. In order to remove adhesions/depositions of this type and in order to clean the print head lower side, the print head cleaner 700 is provided.

The cleaner 700 shown in FIGS. 27 to 29 comprises a container having a tank-shaped recess 710 in which a cleaning bath/solvent (not shown) is received. A feed port and a discharge port are formed on a lower tank portion for feeding and discharging the solvent. The cleaner 700 further comprises two elongate strip-shaped wiper lips 720 which are made of a flexible rubber material. The wiper lips 720 extend along the tank longitudinal direction and have a length that is only slightly shorter than that of the tank. Both wiper lips 720 are held by an elongate carrier element 730. The carrier element 730 comprises a holding portion rectangular in cross-section, in the upper side of which two longitudinal grooves are formed into which the wiper lips 720 are inserted. In addition, the wiper lips 720 are laterally fixed by respectively two screws which are screwed into a lateral surface of the holding portion. The holding portion is fixed to a shaft by means of three screws. The shaft is rotatably supported on the two wall sides of the tank opposed in a longitudinal direction. The rotational movement of the shaft is controlled by the central controller.

The two wiper lips 720 can therefore be pivoted back and forth between the print head cleaning position shown in FIG. 2 and the riper lip regeneration position shown in FIG. 3 by the controlled rotational movement of the shaft.

In this respect, the rotational movement of the shaft is controlled in such a manner that the two wiper lips are generally located in the position shown in FIG. 29, in which the wiper lips 720 plunge into the cleaning bath, so that binding agent and particulate material adhering to the wiper lips can be dissolved in the cleaning bath or at least passes from the wiper lips to the bath, thereby cleaning/regenerating the wiper lips 720 independently. In this context, the filling level of the cleaning bath in the recess 710 is for example chosen in such a manner that at least the wiper lip part projecting from the holding portion plunges completely into the cleaning bath.

Upon completion of a predetermined number of printing displacements, the controller triggers a rotational movement of the shaft by 180°, so that the two wiper lips 720 are brought from the regeneration position shown in FIG. 29 to the print head cleaning position shown in FIG. 28. In addition, the controller controls the print head 510 in such a manner that it moves towards the cleaner 700 and (if necessary several times) cross the same, thereby cleaning its lower side.

Then, the wiper lips 720 are moved back into their regeneration position and the cleaned print head 510 is moved into its parking position.

Figure 30A:
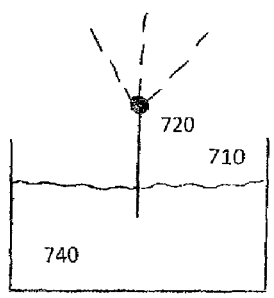
Figure 30B:
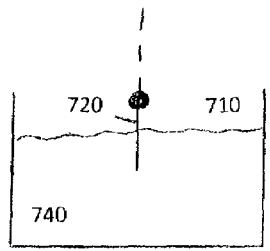
Figure 30C:
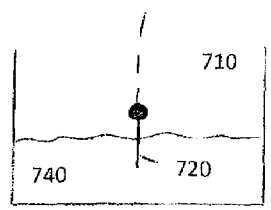
Figure 30D:
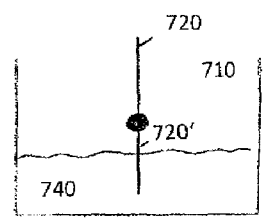
Figure 30E:
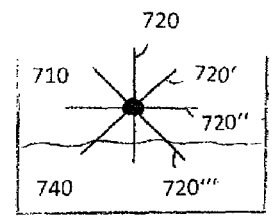
Figure 30F:
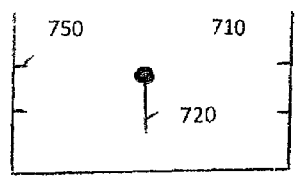

As shown by FIG. 30f (the print head cleaning position is shown in broken lines), several nozzles 750 can be arranged in the tank 710, especially on the lateral walls of the tank 710, by means of which the two wiper lips 720 can be washed in their regeneration position. The nozzles 710 may be provided additionally or as an alternative to the cleaning bath.

Further embodiments of the print head cleaner are shown in FIGS. 30a to 30e, the print head cleaning position being illustrated in broken lines.

The invention claimed is:

1. A construction box for an installation for the layered construction of a shaped body by forming layers of construction material lying one upon another, on a construction platform, and by selectively solidifying a partial area of the respective construction material layer prior to forming the next layer, comprising:
   a front wall, a rear wall and two lateral walls which together define a construction box interior space in which a construction platform is received, wherein a construction box travel drive is integrated in the construction box and configured to move the construction box between a construction box construction position in which the construction box is arranged in a frame of the installation for constructing the shaped body, and an additional construction box position.

2. The construction box according to claim 1, wherein the construction box travel drive integrated in the construction box is configured as an electric travel drive.

3. The construction box according to claim 1, wherein the additional construction box position of the construction box is a construction box unpacking position in which the construction box is moved out of the frame of the installation.

4. The construction box according to claim 1, wherein the construction box travel drive is configured to drive a gearwheel fixed to the construction box, which is coupled to the travel drive.

5. The construction box according to claim 4, wherein the gearwheel is arranged on a lower side of the construction box, and/or wherein the gearwheel is arranged with a vertical or horizontal wheel plane.

6. The construction box according to claim 1, wherein the construction box travel drive is arranged on the outer side of one of the construction box walls with a vertical drive axle.

7. The construction box according to claim 1, wherein at least one lateral guide roll is provided on each lateral side of the construction box.

8. The construction box according to claim 7, wherein the lateral guide rolls are fixed to a lower side of the construction box.

9. The construction box according to claim 1, wherein one of the two lateral walls comprises a tapering alignment recess.

10. The construction box according to claim 1, wherein the construction box has a pair of skids on a lower side.

11. The construction box according to claim 1, wherein the construction platform is height-adjustable and the construction box comprises a construction platform lift drive integrated in the construction box for lifting and lowering the construction platform.

12. The construction box according to claim 11, wherein the construction platform lift drive integrated in the construction box is formed as an electric travel drive, and/or wherein the construction platform lift drive is arranged on the outer side of one of the construction box walls.

13. An installation for the layered construction of a shaped body by forming layers of construction material lying one upon another and by selectively solidifying a partial area of the respective construction material layer prior to forming the next layer, comprising:
the construction box according to claim 1 and
a rail system, along which the construction box is movable between the construction box construction position and the additional construction box position by means of the construction box travel drive.

14. The installation according to claim 13, wherein the rail system comprises a rack oriented laterally, with which a gearwheel that is fixed to the construction box is engaged.

15. The installation according to claim 13, wherein the rail system comprises two guide rails on which lateral guide rolls are capable of rolling off laterally.

16. The installation according to claim 13, wherein an alignment member that is adjustable horizontally perpendicular to the moving direction of the construction box is attached to the frame of the installation, which comprises a tapering end portion that is laterally engaged with a recess of the lateral wall in the construction box construction position.

17. The installation according to claim 13, wherein the construction box is electrically connected to the installation by a drag chain with a central controller and/or a central electric power supply of the installation.

18. The installation according to claim 13, further comprising a housing surrounding the frame of the installation, wherein the housing comprises a construction box move-in/move-out opening through which the construction box is movable between the construction box construction position in which the construction box is arranged in the housing, and the additional construction box position in which the construction box is arranged outside the housing, and wherein the construction box move-in/move-out opening is closed by the rear side or the front side of the construction box in the construction box construction position.

19. An installation for the layered construction of a shaped body by forming layers of construction material lying one upon another and by selectively solidifying a partial area of the respective construction material layer prior to forming the next layer, comprising:
a rail system;
a first construction box according to claim 1, and
a second construction box according to claim 1,
wherein the first construction box is movable along the rail system between a first construction box unpacking position and a common construction box construction position,
wherein the second construction box is movable along the rail system between a second construction box unpacking position and the common construction box construction position, and
wherein the first construction box unpacking position and the second construction box unpacking position are arranged on opposite sides of the frame which on the opposite sides respectively comprises a construction box opening through which the respective construction box is movable.

* * * * *